US011045946B2

United States Patent
Eto et al.

(10) Patent No.: US 11,045,946 B2
(45) Date of Patent: Jun. 29, 2021

(54) HOLDING DEVICE, TRANSPORT SYSTEM, AND CONTROLLER

(71) Applicants: KABUSHIKI KAISHA TOSHIBA, Minato-ku (JP); Toshiba Infrastructure Systems & Solutions Corporation, Kawasaki (JP)

(72) Inventors: Haruna Eto, Ota (JP); Akihito Ogawa, Fujisawa (JP); Kazuma Komoda, Kawasaki (JP); Seiji Tokura, Kawasaki (JP)

(73) Assignees: KABUSHIKI KAISHA TOSHIBA, Minato-ku (JP); Toshiba Infrastructure Systems & Solutions Corporation, Kawasaki (JP)

(*) Notice: Subject to any disclaimer, the term of this patent is extended or adjusted under 35 U.S.C. 154(b) by 254 days.

(21) Appl. No.: 16/108,501

(22) Filed: Aug. 22, 2018

(65) Prior Publication Data

US 2019/0283241 A1 Sep. 19, 2019

(30) Foreign Application Priority Data

Mar. 19, 2018 (JP) .............................. JP2018-051345

(51) Int. Cl.
 *B25J 9/10* (2006.01)
 *B65G 61/00* (2006.01)
 *B25J 9/16* (2006.01)

(52) U.S. Cl.
 CPC ............... *B25J 9/10* (2013.01); *B25J 9/1612* (2013.01); *B65G 61/00* (2013.01)

(58) Field of Classification Search
 CPC combination set(s) only.
 See application file for complete search history.

(56) References Cited

U.S. PATENT DOCUMENTS

| | | | |
|---|---|---|---|
| 9,381,645 B1* | 7/2016 | Yarlagadda | B25J 9/1633 |
| 9,981,382 B1* | 5/2018 | Strauss | B25J 9/1666 |
| 2014/0277715 A1* | 9/2014 | Nagai | B25J 21/00 700/248 |
| 2015/0019013 A1* | 1/2015 | Rose | B25J 15/10 700/258 |
| 2017/0066092 A1* | 3/2017 | Yamamoto | G05B 19/41805 |
| 2017/0177746 A1* | 6/2017 | Gotou | G06F 30/00 |
| 2017/0182665 A1* | 6/2017 | Okuyama | B25J 9/1697 |
| 2019/0030730 A1* | 1/2019 | Tanaka | B25J 9/1697 |
| 2019/0283241 A1* | 9/2019 | Eto | B65G 47/917 |

FOREIGN PATENT DOCUMENTS

| | | |
|---|---|---|
| JP | 5-97272 | 4/1993 |
| JP | 6-126676 | 5/1994 |
| JP | 8-155872 | 6/1996 |
| WO | WO 2017/149616 A1 | 9/2017 |

* cited by examiner

*Primary Examiner* — Bhavesh V Amin
(74) *Attorney, Agent, or Firm* — Oblon, McClelland, Maier & Neustadt, L.L.P.

(57) ABSTRACT

According to one embodiment, a holding device includes a holder and a controller. The holder is configured to hold an object. The controller is configured to determine a holding posture and a holding position of the holder with respect to the object so that at least one of protrusion of the holder from an outer shape of the object and protrusion of the object from an outer shape of the holder satisfies a predetermined condition when viewed in a direction in which the object and the holder overlap each other, based on information indicating the outer shape of the object.

18 Claims, 28 Drawing Sheets

| 2 | 2 | 2 | 2 | 2 | 2 | 2 | 1 | 1 | 1 | 1 | 2 | 2 | 2 | 2 | 2 | 2 | 2 |
|---|---|---|---|---|---|---|---|---|---|---|---|---|---|---|---|---|---|
| 2 | 2 | 2 | 2 | 2 | 2 | 2 | 1 | 1 | 1 | 1 | 2 | 2 | 2 | 2 | 2 | 2 | 2 |
| 2 | 2 | 2 | 2 | 2 | 2 | 2 | 1 | 1 | 1 | 1 | 2 | 2 | 2 | 2 | 2 | 2 | 2 |
| 2 | 2 | 2 | 2 | 2 | 2 | 2 | 1 | 1 | 1 | 1 | 2 | 2 | 2 | 2 | 2 | 2 | 2 |
| 2 | 2 | 2 | 2 | 2 | 2 | 2 | 1 | 1 | 1 | 1 | 2 | 2 | 2 | 2 | 2 | 2 | 2 |
| 2 | 2 | 2 | 2 | 2 | 2 | 2 | 1 | 1 | 1 | 1 | 2 | 2 | 2 | 2 | 2 | 2 | 2 |
| 2 | 2 | 2 | 2 | 2 | 2 | 2 | 1 | 1 | 1 | 1 | 2 | 2 | 2 | 2 | 2 | 2 | 2 |
| 1 | 1 | 1 | 1 | 1 | 1 | 1 | 0 | 0 | 0 | 0 | 1 | 1 | 1 | 1 | 1 | 1 | 1 |
| 1 | 1 | 1 | 1 | 1 | 1 | 1 | 0 | 0 | 0 | 0 | 1 | 1 | 1 | 1 | 1 | 1 | 1 |
| 1 | 1 | 1 | 1 | 1 | 1 | 1 | 0 | 0 | 0 | 0 | 1 | 1 | 1 | 1 | 1 | 1 | 1 |
| 1 | 1 | 1 | 1 | 1 | 1 | 1 | 0 | 0 | 0 | 0 | 1 | 1 | 1 | 1 | 1 | 1 | 1 |
| 1 | 1 | 1 | 1 | 1 | 1 | 1 | 0 | 0 | 0 | 0 | 1 | 1 | 1 | 1 | 1 | 1 | 1 |
| 1 | 1 | 1 | 1 | 1 | 1 | 1 | 0 | 0 | 0 | 0 | 1 | 1 | 1 | 1 | 1 | 1 | 1 |
| 2 | 2 | 2 | 2 | 2 | 2 | 2 | 1 | 1 | 1 | 1 | 2 | 2 | 2 | 2 | 2 | 2 | 2 |
| 2 | 2 | 2 | 2 | 2 | 2 | 2 | 1 | 1 | 1 | 1 | 2 | 2 | 2 | 2 | 2 | 2 | 2 |
| 2 | 2 | 2 | 2 | 2 | 2 | 2 | 1 | 1 | 1 | 1 | 2 | 2 | 2 | 2 | 2 | 2 | 2 |
| 2 | 2 | 2 | 2 | 2 | 2 | 2 | 1 | 1 | 1 | 1 | 2 | 2 | 2 | 2 | 2 | 2 | 2 |
| 2 | 2 | 2 | 2 | 2 | 2 | 2 | 1 | 1 | 1 | 1 | 2 | 2 | 2 | 2 | 2 | 2 | 2 |
| 2 | 2 | 2 | 2 | 2 | 2 | 2 | 1 | 1 | 1 | 1 | 2 | 2 | 2 | 2 | 2 | 2 | 2 |
| 2 | 2 | 2 | 2 | 2 | 2 | 2 | 1 | 1 | 1 | 1 | 2 | 2 | 2 | 2 | 2 | 2 | 2 |

FIG. 14

| REGION IN WHICH THERE ARE TWO PROTRUDING SIDES | | | | 0 | 0 | 0 | 0 | REGION IN WHICH THERE ARE TWO PROTRUDING SIDES | | | |
|---|---|---|---|---|---|---|---|---|---|---|---|
| | | | | 0 | 0 | 0 | 0 | | | | |
| | | | | 0 | 0 | 0 | 0 | | | | |
| | | | | 0 | 0 | 0 | 0 | | | | |
| | | | | 0 | 0 | 0 | 0 | | | | |
| | | | | 0 | 0 | 0 | 0 | | | | |
| | | | | 0 | 0 | 0 | 0 | | | | |
| 0 | 0 | 0 | 1 | 1 | 1 | 0 | 0 | 0 | 0 | 0 | 0 | 0 | 0 | 0 | 0 | 0 |
| 0 | 0 | 0 | 0 | 1 | 1 | 0 | 0 | 0 | 0 | 0 | 0 | 0 | 0 | 0 | 0 | 0 |
| 0 | 0 | 0 | 0 | 1 | 1 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| REGION IN WHICH THERE ARE TWO PROTRUDING SIDES | | | | 0 | 0 | 0 | 0 | REGION IN WHICH THERE ARE TWO PROTRUDING SIDES | | | |
| | | | | 0 | 0 | 0 | 0 | | | | |
| | | | | 0 | 0 | 0 | 0 | | | | |
| | | | | 0 | 0 | 0 | 0 | | | | |
| | | | | 0 | 0 | 0 | 0 | | | | |
| | | | | 0 | 0 | 0 | 0 | | | | |
| | | | | 0 | 0 | 0 | 0 | | | | |

FIG. 17

| 2 | 2 | 2 | 2 | 3 | 3 | 3 | 3 | 2 | 2 | 2 | 2 | 2 | 2 | 2 |
|---|---|---|---|---|---|---|---|---|---|---|---|---|---|---|
| 2 | 2 | 2 | 2 | 3 | 3 | 3 | 3 | 2 | 2 | 2 | 2 | 2 | 2 | 2 |
| 2 | 2 | 2 | 2 | 3 | 3 | 3 | 3 | 2 | 2 | 2 | 2 | 2 | 2 | 2 |
| 2 | 2 | 2 | 2 | 3 | 3 | 3 | 3 | 2 | 2 | 2 | 2 | 2 | 2 | 2 |
| 3 | 3 | 3 | 3 | 4 | 4 | 4 | 4 | 3 | 3 | 3 | 3 | 3 | 3 | 3 |
| 3 | 3 | 3 | 3 | 4 | 4 | 4 | 4 | 3 | 3 | 3 | 3 | 3 | 3 | 3 |
| 3 | 3 | 3 | 3 | 4 | 4 | 4 | 4 | 3 | 3 | 3 | 3 | 3 | 3 | 3 |
| 3 | 3 | 3 | 3 | 4 | 4 | 4 | 4 | 3 | 3 | 3 | 3 | 3 | 3 | 3 |
| 3 | 3 | 3 | 3 | 4 | 4 | 4 | 4 | 3 | 3 | 3 | 3 | 3 | 3 | 3 |
| 3 | 3 | 3 | 3 | 4 | 4 | 4 | 4 | 3 | 3 | 3 | 3 | 3 | 3 | 3 |
| 2 | 2 | 2 | 2 | 3 | 3 | 3 | 3 | 2 | 2 | 2 | 2 | 2 | 2 | 2 |
| 2 | 2 | 2 | 2 | 3 | 3 | 3 | 3 | 2 | 2 | 2 | 2 | 2 | 2 | 2 |
| 2 | 2 | 2 | 2 | 3 | 3 | 3 | 3 | 2 | 2 | 2 | 2 | 2 | 2 | 2 |
| 2 | 2 | 2 | 2 | 3 | 3 | 3 | 3 | 2 | 2 | 2 | 2 | 2 | 2 | 2 |

HOLDING DEVICE, TRANSPORT SYSTEM, AND CONTROLLER

CROSS-REFERENCE TO RELATED APPLICATION

This application is based upon and claims the benefit of priority from Japanese Patent Application No. 2018-051345 filed on Mar. 19, 2018, the entire contents of which are incorporated herein by reference.

FIELD

Embodiments described herein relate generally to a holding device, a transport system, and a controller.

BACKGROUND

A holding device for holding and moving an object is known. It may be preferable that moved objects be able to be packed densely by such a holding device.

BRIEF DESCRIPTION OF THE DRAWINGS

FIG. 11B is a diagram showing an example of bitmap data showing a shape, a size, and a position of an effective sucker according to the first embodiment.

FIG. 11D is a diagram showing an example of hit data obtained by binarizing the calculation result of the convolution according to the first embodiment.

FIG. 13 is a diagram showing an example of bit map data showing the number of sides of the outer shape of the object from which the holder protrudes according to the first embodiment.

FIG. 14 is a diagram showing an example of data showing a set of holdable positions satisfying a predetermined condition according to the first embodiment.

FIG. 17 is a diagram showing an example of bitmap data showing the number of sides of the outer shape of the object from which the holder protrudes according to a first modification example of the first embodiment.

DETAILED DESCRIPTION OF THE INVENTION

Figure 1:
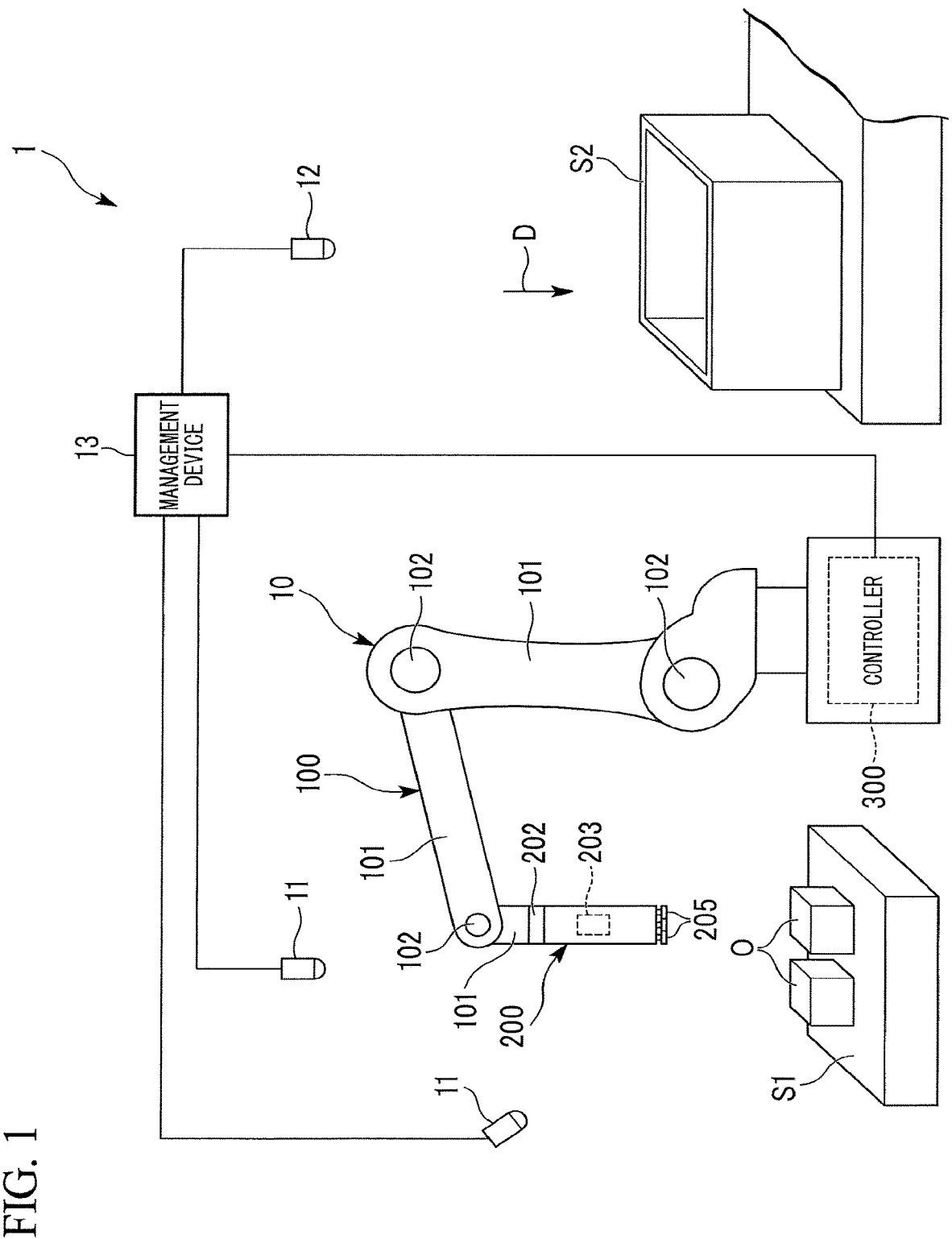
FIG. 1 is a diagram schematically showing a transport system according to a first embodiment.

According to one embodiment, a holding device includes a holder and a controller. The holder is configured to hold an object. The controller is configured to determine a holding posture and a holding position of the holder with respect to the object so that at least one of protrusion of the holder from an outer shape of the object and protrusion of the object from an outer shape of the holder satisfies a predetermined condition when viewed in a direction in which the object and the holder overlap each other, based on information indicating the outer shape of the object.

Hereinafter, a holding device, a transport system, a controller, and a holding method of embodiments will be described with reference to the drawings. In the following description, components having the same or similar functions are denoted by the same reference numerals. Duplicate description of these components may be omitted. In the specification, the term "based on XX" represents "based at least on XX" and includes the case of being based on any other element in addition to XX. In addition, the term "based on XX" is not limited to "based directly on XX", but also represents "based on something that is acquired by an arithmetic operation or other process being performed on XX". Here, "XX" is an arbitrary element (for example, arbitrary information).

A first embodiment will be described with reference to FIGS. 1 to 16. FIG. 1 is a diagram schematically showing a transport system 1 including a holding device 10 according to the first embodiment. The transport system 1 is, for example, a handling system (picking system) for distribution. The transport system 1 moves an object (that is, a holding target, a transport target) O located at a movement source S1 to a movement destination S2.

The movement source S1 is, for example, one of various conveyors, various pallets, or containers such as totes and oricons, but is not limited thereto. Various objects O having different sizes or weights are randomly placed on the movement source S1. In the first embodiment, the objects O (holding targets) include various objects from a small object such as a 5 cm×5 cm-top face object to a large object such as a 30 cm×30 cm-top face object. Further, the objects O includes various objects from a light object such as an object of tens of g to a heavy object such as an object of several kilograms. However, the size or the weight of the object O is not limited to the above examples.

The movement destination S2 is, for example, a container such as a tote or an oricon, but the movement destination S2 is not limited thereto. The "container" broadly means a member (for example, a box-like member) that can accommodate the object O. Hereinafter, the "movement destination S2" may be referred to as a "movement destination container S2" for convenience of description. However, the holding device 10 and the transport system 1 may move the object O to the movement destination S2 other than a container.

Further, the holding device 10 and the transport system 1 are not limited to a handling system for distribution, and can be widely applied to industrial robot systems, other systems, and the like. The "holding device", the "transport system" and the "holding method" described in the specification are not limited to devices, systems, and methods of which a main purpose is transportation of objects, and include a device, a system, and a method involving the transport (movement) of an object as a part of product assembly or other purposes.

First, an overall configuration of the transport system 1 will be described. As shown in FIG. 1, the transport system 1 includes, for example, a holding device 10, one or more first detectors 11, one or more second detectors 12, and a management device 13.

The holding device (that is, transport device) 10 is, for example, a robot device, and holds an object O located at the movement source S1 and moves the held object O to the movement destination S2. The holding device 10 can communicate with the management device 13 in a wired manner or wirelessly. The holding device 10 will be described in detail below.

The first detector 11 is a camera or one of various sensors arranged near the movement source S1 (for example, immediately above or obliquely above the movement source S1). For example, the first detector 11 acquires information relating to the object O located at the movement source S1 and information relating to the movement source S1. The information acquired by the first detector 11 is, for example, "image data", "distance image data", and/or "shape data". The "distance image data" is image data having distance information in one or more directions (for example, depth information from an arbitrary reference plane set above the movement source S1). The "shape data" is information indicating an outer shape of the object O or the like. The information detected by the first detector 11 is output to the management device 13. The first detector 11 may be provided as a part of the holding device 10. In this case, the information detected by the first detector 11 may be directly output to the controller 300 (to be described below) of the holding device 10.

The second detector 12 is a camera or one of various sensors arranged near the movement destination container S2 (for example, immediately above or obliquely above the movement destination container S2). The second detector 12, for example, detects information relating to a shape of the movement destination container S2 (including a shape of an inner wall surface or a partition) and information relating to an object O previously placed in the movement destination container S2. The information acquired by the second detector 12 is, for example, "image data", "distance image data", and/or "shape data". It should be noted that the second detector 12 may be provided as a part of the holding device 10. In this case, the information detected by the second detector 12 may be directly output to the controller 300 of the holding device 10.

The management device (for example, higher-level controller) 13 performs management and control of the entire transport system 1. For example, the management device 13 acquires the information detected by the first detector 11 and the second detector 12, and outputs the acquired information to the holding device 10.

Next, the holding device 10 will be described. As shown in FIG. 1, the holding device 10 includes, for example, a moving mechanism 100, a holder 200, and a controller (that is, control device) 300.

The moving mechanism 100 is a mechanism that moves the holder 200 to a desired position. For example, the moving mechanism 100 is a six-axis vertical articulated robot arm and includes a plurality of arm members 101, and a plurality of rotators 102 rotatably connecting the plurality of arm members 101. However, the moving mechanism 100 may be a triaxial vertical robot arm, or may be a mechanism that moves the holder 200 to a desired position using other configurations. For example, the moving mechanism 100 may be a flying body (for example, a drone) or the like that lifts and moves the holder 200 using rotary blades.

The holder 200 is a holding mechanism that holds the object O located at the movement source S1. The holder 200 is connected to the moving mechanism 100 via a rotator 202 which will be described below. For example, the holder 200 includes a suction device 203, one or more suckers 205 communicating with the suction device 203, and holds the object O by suction. However, the holder 200 may be a holder that holds the object O by holding the object O using a plurality of pinching members, or may be a holder that holds the object O using other mechanisms. It should be noted that, hereinafter, an example in which the holder 200 includes a plurality of suckers 205 will be described.

Figure 2:
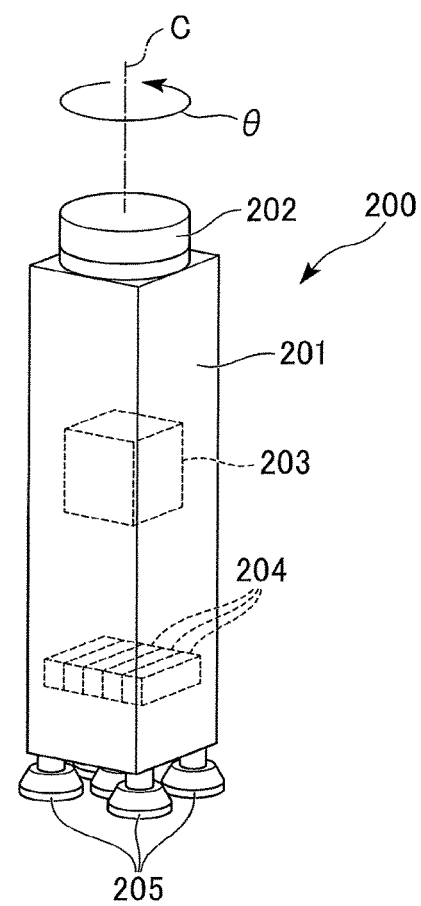
FIG. 2 is a perspective view showing a holder of the first embodiment.

FIG. 2 is a perspective view showing the holder 200 of this embodiment. The holder 200 includes, for example, a base 201, a rotator 202, a suction device 203, a plurality of switching valves 204, and a plurality of suckers 205 (for example, suction pads).

The base 201 has, for example, an outer shape which is a cubic shape, and forms an outer case of the holder 200. The base 201 is connected to the moving mechanism 100 via the rotator 202. The base 201 may be formed in a box shape or may be configured only of a frame.

The rotator 202 is provided between the base 201 and the moving mechanism 100 and rotatably connects the base 201 to the moving mechanism 100. A rotation center axis C of the rotator 202 substantially coincides with a direction in which a distal end portion of the moving mechanism 100 and the base 201 are aligned. The rotator 202 can rotate the base 201 of the holder 200 in a θ direction and a direction opposite thereto in FIG. 2 with respect to the moving mechanism 100. It should be noted that the rotator 202 may be provided as a part of the moving mechanism 100, not as a part of the holder 200.

The suction device 203 is provided inside the base 201. The suction device 203 is, for example, a vacuum pump. The suction device 203 communicates with each of the plurality of suckers 205 via a hose or the like. In a case where the suction device 203 is driven, the pressure in each sucker 205 becomes lower than an atmospheric pressure, and the object O is sucked and held by the sucker 205.

The plurality of switching valves 204 are provided in one-to-one correspondence with the plurality of suckers 205. Each switching valve 204 can be switched between a first state in which the corresponding sucker 205 and the suction device 203 communicate with each other and a second state in which communication between the corresponding sucker 205 and the suction device 203 is blocked and the sucker 205 externally communicates with the outside (that is, atmospheric pressure space) of the holding device 10. In a case where the object O is relatively small, the holding device 10 causes only one or a small number of suckers 205 selected from the plurality of one of more suckers 205 to function as suckers 205 (hereinafter, "effective sucker 205E") to be used for holding. It should be noted that in some of the figures described below, by applying a dot pattern to the effective suckers 205E among the plurality of suckers 205, the effective suckers 205E and the other suckers 205 are shown to be distinguished from each other.

The plurality of suckers 205 are arranged side by side in one end portion of the base 201. The sucker 205 has an outer shape smaller than a smallest object to be located at the movement source S1. In a case where the object O is relatively small and light, the holding device 10 sucks and holds the object O using only one or more effective suckers 205E selected from the plurality of suckers 205. This embodiment is an example in which a 5 cm×5 cm-top face object can be placed at the movement source S1, and the sucker 205 has, for example, a circular shape having a diameter of 4 cm.

On the other hand, an upper limit is set for the weight of the object O that each of the suckers 205 can suck and hold as a single body. In a case where the object O is relatively large and heavy, the holding device 10 sucks and holds the heavy object O using two or more effective suckers 205E together among the plurality of suckers 205. In the first embodiment, a weight that can be sucked and held by one sucker 205 is, for example, approximately 2 kg. In the first embodiment, the holder 200 can hold the object O of a maximum of about 10 kg by providing with five suckers 205.

Figure 3:
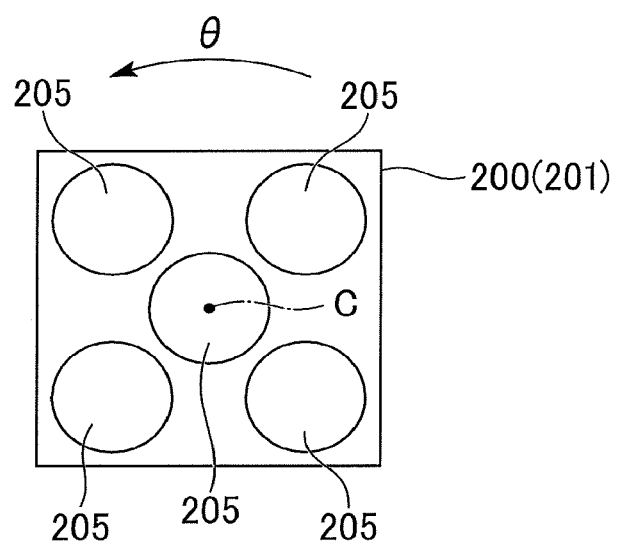
FIG. 3 is a bottom view showing an arrangement layout of a plurality of suckers according to the first embodiment.

FIG. 3 is a bottom view showing an arrangement layout of the plurality of suckers 205 according to the first embodiment. In the first embodiment, an outer shape of the holder 200 (for example, an outer shape of the base 201) has, for example, a square shape of 12 cm×12 cm. As described above, the holder 200 includes five suckers 205. The five suckers 205 include one sucker 205 disposed substantially at a center of the holder 200 and four suckers 205 separated and arranged around the center sucker 205 to correspond to four corners of the holder 200. The four suckers 205 can be rotated in the θ direction and the direction opposite thereto about the rotation center axis C of the rotator 202 by the above-described rotator 202 being rotated.

Figure 4:
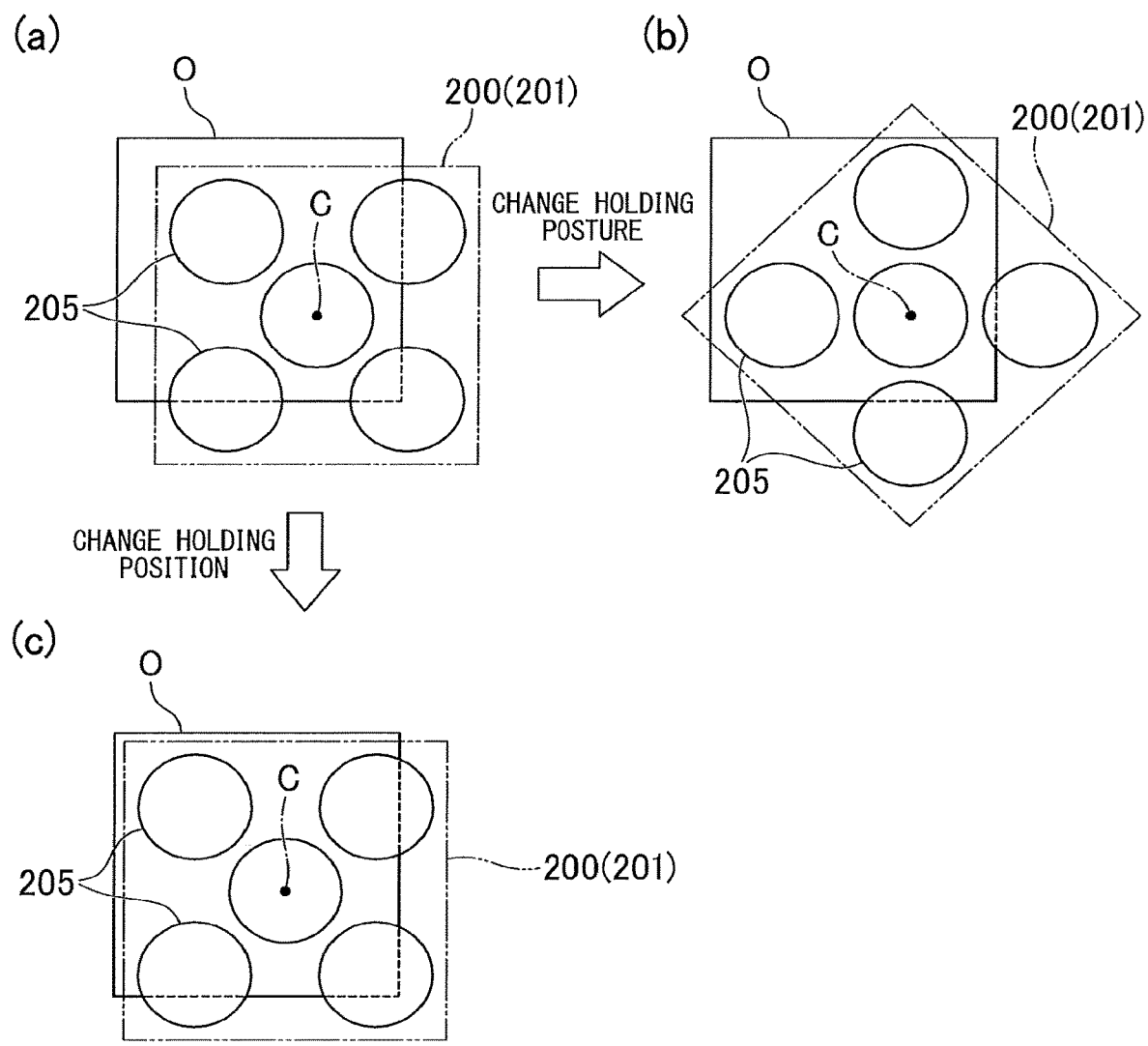
FIG. 4 is a view showing a holding posture and a holding position of the first embodiment.

Here, a "holding posture" and a "holding position" described in this specification are defined. FIG. 4 is a view showing the "holding posture" and the "holding position". The "holding posture" in this specification means an angular position (that is, a rotational position in the θ direction) of the holder 200 with respect to the object O. For example, in a case where the "holding posture" is changed from a state of (a) in FIG. 4, a position of a center of the holder 200 (that is, the rotation center axis C of the rotator 202) is not changed from the state of (a) in FIG. 4, but an orientation of the outer shape of the holder 200 with respect to the outer shape of the object O is changed. The holding posture of the holder 200 can be changed due to rotation of the rotator 202.

On the other hand, the "holding position" in this specification means a position in a case where the holder 200 is moved in parallel with respect to the object O. For example, in a case where the "holding position" is changed from the state of (a) in FIG. 4, the "holding posture" of the holder 200 is not changed from the state of (a) in FIG. 4, but the position of the center of the holder 200 with respect to the center of the object O is changed. The holding position of the holder 200 can be changed due to the operation of the moving mechanism 100.

Figure 5:
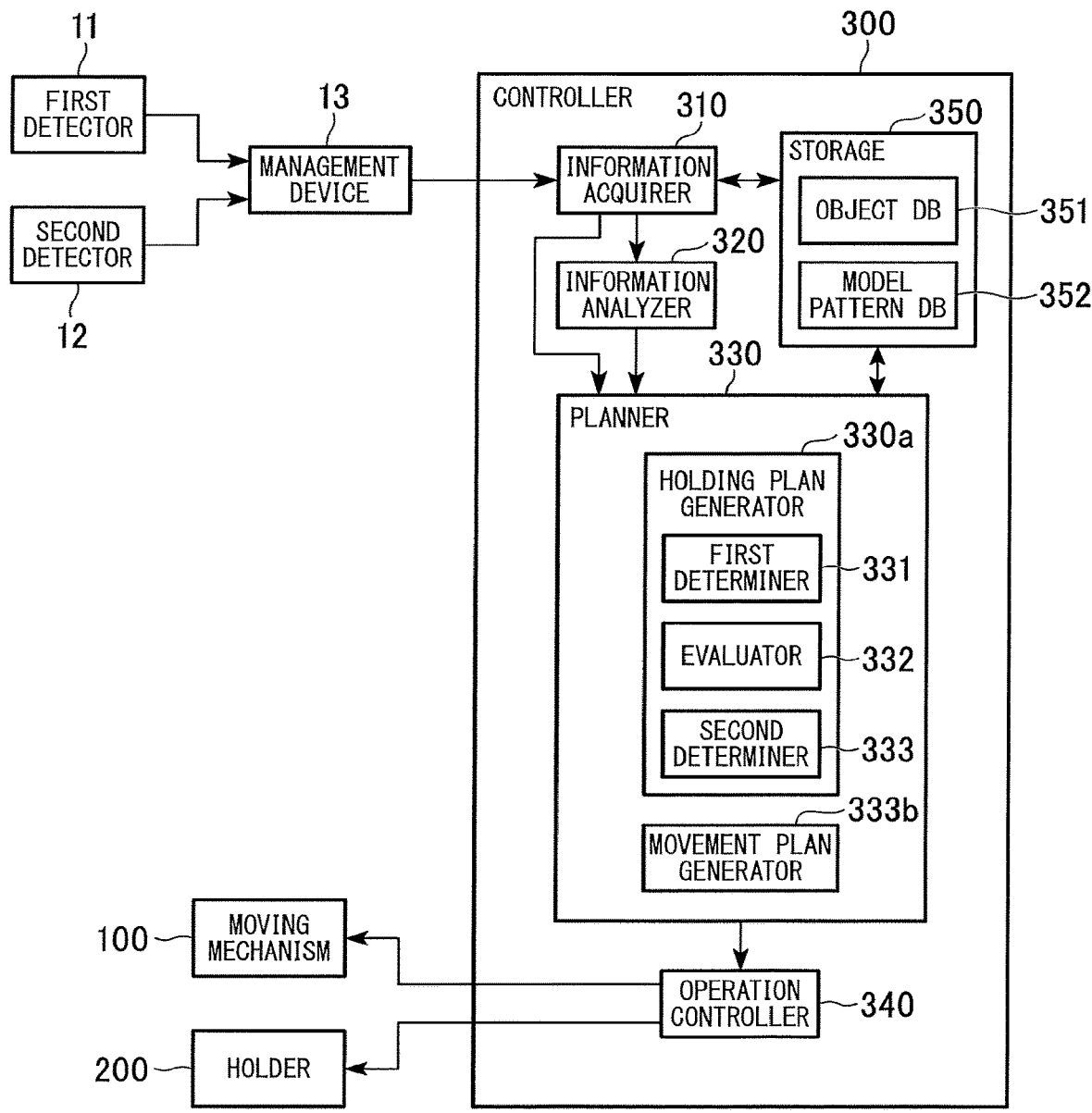
FIG. 5 is a block diagram showing a system configuration of the transport system according to the first embodiment.

Next, the controller 300 will be described. The controller 300 controls the overall operation of the holding device 10. The controller 300 is an example of a "controller". FIG. 5 is a block diagram showing a system configuration of the transport system 1. The controller 300 includes, for example, an information acquirer 310, an information analyzer 320, a planner 330, an operation controller 340, and a storage 350.

For example, all or a part of each functional unit (for example, the information acquirer 310, the information analyzer 320, the planner 330, and the operation controller 340) is realized, for example, by one or more processors such as a central processing unit (CPU) or a graphics processing unit (GPU) executing a program stored in a program memory. However, all or a part of each functional unit may be realized by hardware (for example, a circuit; circuitry) such as a large scale integration (LSI), an application specific integrated circuit (ASIC), a field-programmable gate array (FPGA), or a programmable logic device (PLD). All or some of the functional units may be realized in a combination of the software functional unit and the hardware. The storage 350 is realized by a flash memory, an electrically erasable programmable read-only memory (EEPROM), a read-only memory (ROM), a random access memory (RAM), and the like.

Here, for convenience of description, the storage 350 will first be described. For example, an object database 351 (hereinafter referred to as "object DB 351"), a model pattern database 352 (hereinafter referred to as a "model pattern DB 352"), information indicating the outer shape of the holder 200 (hereinafter referred to as a "holder outer shape information"), and information indicating a weight that can be held by each sucker 205 are stored in the storage 350.

For example, the type or identification information of the objects O located at the movement source S1 and the weight information of the objects O are registered in association with each other in the object DB 351. Model patterns relating to the suckers 205 are registered in the model pattern DB 352. The model pattern will be described below in detail. Information indicating a position of one or more the effective sucker 205E in each model pattern is registered in the model pattern DB.

The "holder outer shape information" includes, for example, information indicating the outer shape of the holder 200 when viewed in a specific direction D (see FIG. 1). The specific direction D is, for example, a direction in which the object O and the holder 200 overlap each other at a timing at which the object O is placed within the movement destination container S2 (for example, a timing immediately before the object O is released). In another viewpoint, the "specific direction D" is a direction in which the suckers 205 come into contact with the object O in a case where the holder 200 including the suckers 205 is provided.

It should be noted that the object DB 351, the model pattern DB 352, the holder outer shape information, and the information indicating the holdable weight of each sucker 205 may be stored in the management device 13 instead of being stored in the storage 350 of the holding device 10, or may be stored in another device with which the holding device 10 can communicates via a network.

Next, each functional unit of the controller 300 will be described. The information acquirer 310 acquires the information detected by the first detector 11 and the second detector 12 from the management device 13. "Acquire" described in the present specification is not limited to a case in which information is acquired by sending a transmission request, and includes a case in which information is acquired through passive reception. The information acquirer 310 outputs the information acquired from the first detector 11 and the second detector 12 to the information analyzer 320.

Further, the information acquirer 310 acquires information indicating the weight of the object O (that is, a holding target) located at the movement source S1. For example, the information acquirer 310 determines the type or identification information of the object O based on feature information of the object O included in the image data detected by the first detector 11 (for example, tag information such as radio frequency identifier (RFID) attached to the object O), and acquires weight information registered corresponding to the determined type or identification information of the object O from the object DB 351. The information acquirer 310 outputs the acquired weight information to the planner 330 as "object weight information".

The information analyzer 320 generates various types of information used for control of the holding device 10 based on the information detected by the first detector 11 and the second detector 12. For example, the information analyzer 320 generates at least a part of the information by performing a predetermined image process on the image data or distance image data. The above information includes, for example, "object outer shape information", "holdable region information", "calculation target region information", "movement source shape information", "movement destination shape information", and "movement destination loading information". The information analyzer 320 outputs such information to the planner 330.

Figure 6:
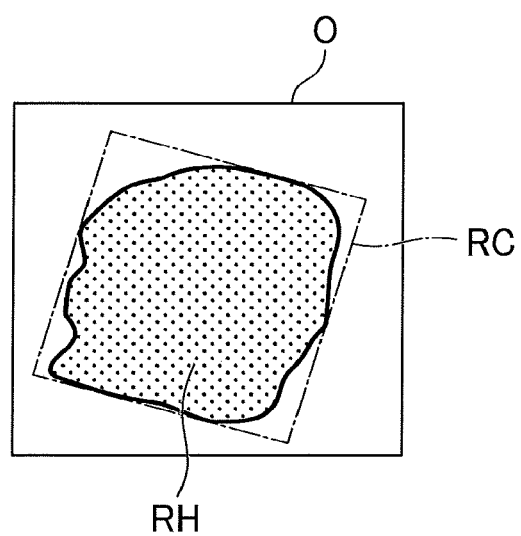
FIG. 6 is a plan view showing object outer shape information, holdable region information, and calculation target region information according to the first embodiment.

FIG. 6 is a plan view showing the "object outer shape information", the "holdable region information", and the "calculation target region information".

The "object outer shape information" is, for example, image data of the object O, distance image data of the object O, shape data of the object O, or information derived from at least one of the image data of the object O, the distance image data of the object O, and the shape data of the object O. The "object outer shape information" is information indicating the outer shape of the object O (that is, a holding target) located at the movement source S1. The "object outer shape information" includes, for example, information indicating the outer shape of the object O when viewed in the specific direction D.

The "holdable region information" is, for example, the image data of the object O, the distance image data of the object O, the shape data of the object O, or information derived from at least one of the image data of the object O, the distance image data of the object O, and the shape data of the object O. The "holdable region information" is information indicating a region RH (hereinafter referred to as "holdable region RH") that can be held by the holder 200 in a surface of the object O. The holdable region RH is specified as a region extending in the surface of the object O. The holdable region RH is, for example, a flat portion in the surface of the object O, but is not limited to a perfect plane. For example, the holdable region RH may be flat to be able to be held by the sucker 205, and may include fine irregularities or steps. In the first embodiment, the information analyzer 320 determines a continuous region having no irregularities or steps exceeding a threshold in the surface of the object O detected by the first detector 11 to be the holdable region RH, and generates "holdable region information" based on the determination.

The "calculation target region information" is information indicating a target region (hereinafter referred to as a "calculation target region RC") in which a convolution calculation to be described below is performed in the surface of the object O. In the first embodiment, the calculation target region RC is expressed using a polygon circumscribing the holdable region RH. For example, the "calculation target region information" is information indicating a shape and a size of the polygon circumscribing the holdable region RH and a posture (inclination) of the polygon with respect to the outer shape of the object O. The information analyzer 320 generates the "calculation target region information" by obtaining a polygon circumscribing the holdable region RH.

The "movement source shape information" is information indicating a shape of the movement source S1 serving as an obstacle when the object O at the movement source S1 is held by the holder 200. The information analyzer 320 generates the "movement source shape information" based on the information detected by the first detector 11, for example.

The "movement destination shape information" is information indicating a shape of the movement destination S2 serving as an obstacle when the object O is moved to the movement destination S2. For example, the "movement destination shape information" is information indicating a wall that defines an inner wall surface of the movement destination container S2 or a partition provided inside the movement destination container S2. The "movement destination loading information" is information indicating the object O previously placed in the movement destination container S2. The information analyzer 320 generates the "movement destination shape information" and the "movement destination loading information" based on the information detected by the second detector 12, for example.

Next, referring back to FIG. 5, the planner 330 will be described. The planner 330 includes, for example, a holding plan generator 330a and a movement plan generator 330h. The holding plan generator 330a generates a holding plan for holding the object O located at the movement source S1 by the holder 200. The movement plan generator 330b generates a movement plan for moving the object O held by the holder 200 to the movement destination S2.

First, the holding plan generator 330a will be described. The holding plan generator 330a of the first embodiment determines a holding posture and a holding position of the holder 200 with respect to the object O so that protrusion of the holder 200 from the outer shape of the object O satisfies predetermined conditions when viewed from the direction (for example, the specific direction D) in which the object O and the holder 200 overlap. In order to realize this function, the holding plan generator 330a includes, for example, a first determiner 331, an evaluator 332, and a second determiner 333. It should be noted that, in the following description, "protrusion" means, for example, a protrusion in a plane perpendicular to the specific direction D.

(Process of First Determiner)

First, the first determiner 331 will be described. The first determiner 331 determines a plurality of holdable postures of the holder 200 with respect to the object O based on the information indicating the holdable region RH of the object O (the "holdable region information" described above). The "holdable posture" is the holding posture of the holder 200 capable of holding the object O located at the movement source S1, and is an evaluation target of the evaluator 332. For example, the first determiner 331 may determine various holding postures in each of which a sufficient number of suckers 205 capable of holding the weight of the object O are disposed within the holdable region RH of the object O, as holdable postures.

Figure 7:
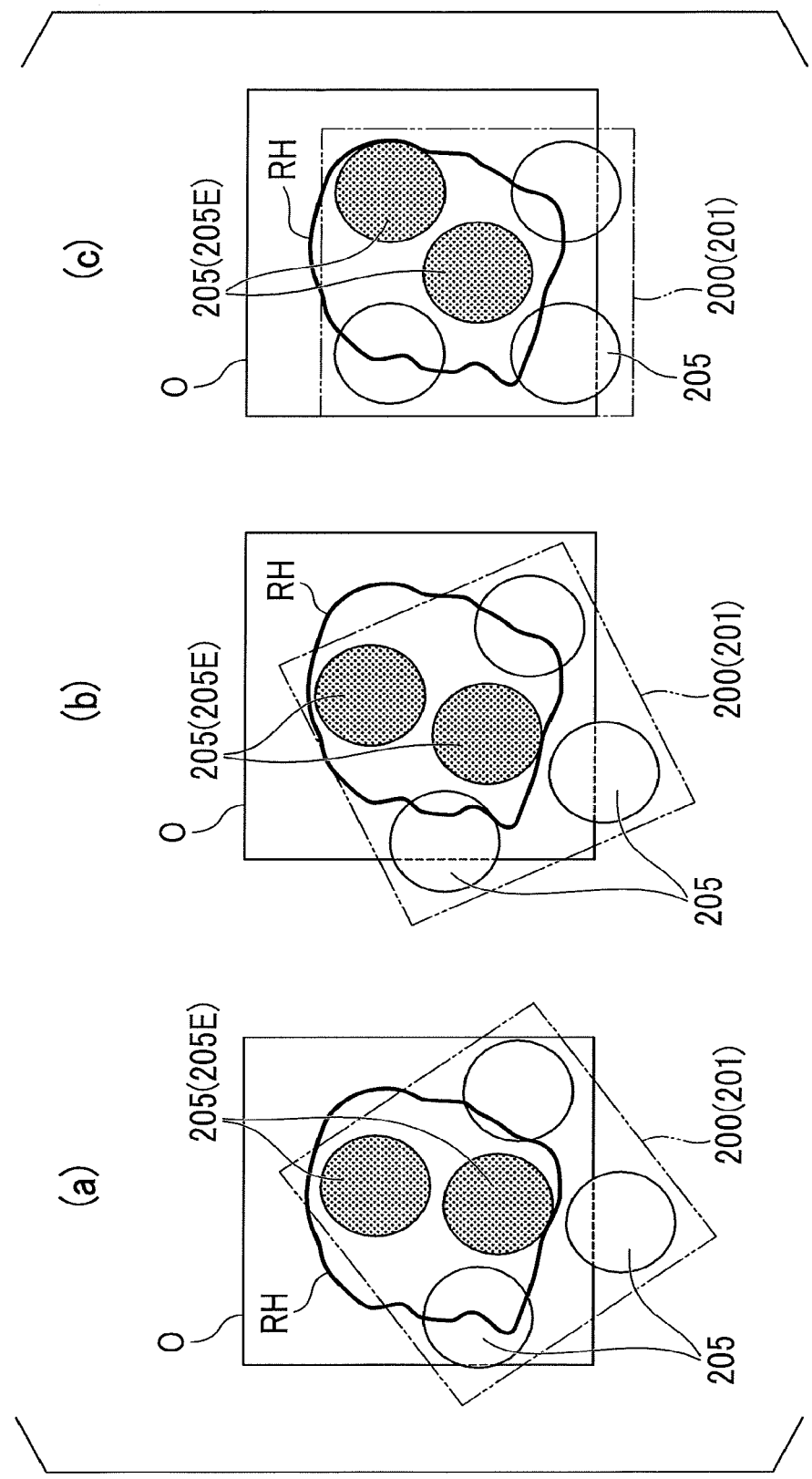
FIG. 7 is a view showing holdable postures according to the first embodiment.

FIG. 7 is a view showing the holdable postures. For example, FIG. 7 shows an example of three holding postures in which two effective suckers 205E are disposed within the holdable region RH. The three holdable postures differ from each other in an angular position of the outer shape of the holder 200 with respect to the outer shape of the object O. (a) in FIG. 7 shows the holding posture in which the holder 200 protrudes from three sides of the outer shape of the object O. (b) in FIG. 7 shows the holding posture in which the holder 200 protrudes from two sides of the outer shape of the object O. (c) in FIG. 7 shows the holding posture in which the holder 200 protrudes from one side of the outer shape of the object O.

Further, in the first embodiment, in addition to determining the plurality of holdable postures, the first determiner 331 determines a plurality of holdable positions of the holder 200 with respect to the object O in each of the plurality of holdable postures. The "holdable position" is a holding position of the holder 200 capable of holding the object O located at the movement source S1, and is an evaluation target of the evaluator 332. For example, the first determiner 331 determines each of various holding positions at which a sufficient number of the suckers 205 capable of holding the weight of the object O are disposed within the holdable region RH of the object O, as a holdable position.

Hereinafter, an example of a process of the first determiner 331 will be described in detail. In the first embodiment, the first determiner 331 determines a plurality of holdable postures and a plurality of holdable positions in each of the plurality of holdable postures based on information indicating the holdable region RH of the object O (the "holdable region information" described above), information indicating the weight of the object O (the "object weight information" described above), and model patterns relating to the suckers 205. The processes include (a) a model pattern selection process, and (b) a holdable posture and holdable position determination process.

<Model Pattern>

Figure 8:
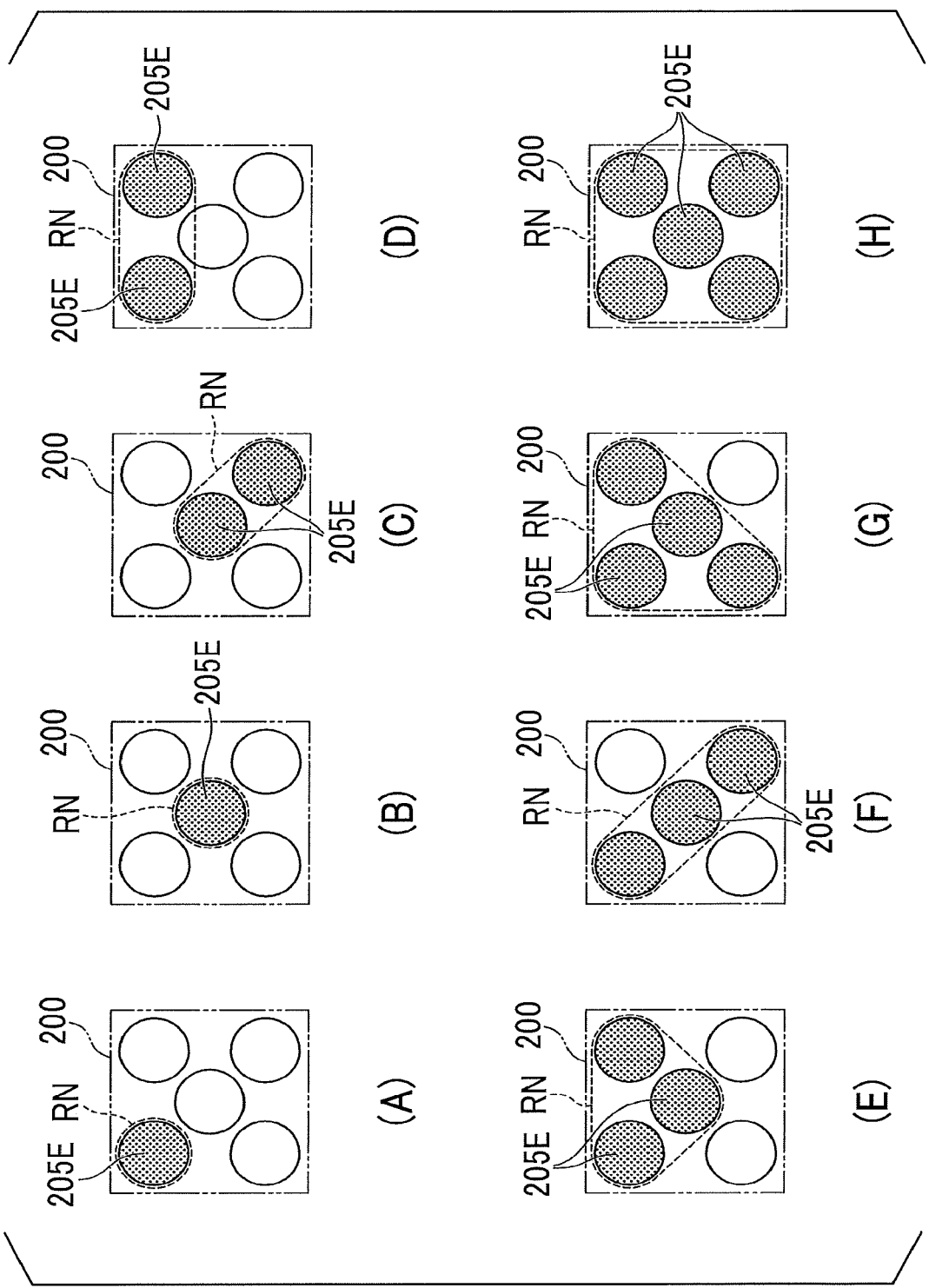
FIG. 8 is a view showing model patterns of suckers according to the first embodiment.

First, a "model patterns relating to suckers" will be described as a premise. FIG. 8 is a diagram showing model patterns relating to the suckers 205 of the first embodiment. Here, in a case where one or a small number of suckers 205 are selected and used as the effective suckers 205E from the plurality of suckers 205, there are a plurality of arrangement patterns as arrangement positions of the effective suckers 205E. For example, in a case where there are five suckers 205 as in the first embodiment, there are 31 arrangement patterns.

Here, in a case where the arrangement positions of the plurality of suckers 205 and the outer shape of the holder 200 have symmetry (hereinafter referred to as "symmetry of the arrangement position of the suckers 205 and the like"), the plurality of arrangement patterns of the suckers 205 can be limited to a small number of model patterns based on the symmetry of the arrangement positions of the suckers 205 and the like. For example, in a case where there are five suckers 205 as in this embodiment, the 31 arrangement patterns can be limited to the eight model patterns shown in FIG. 8. Therefore, a part of the calculation regarding the determination of the holdable posture can be performed by performing calculation on only the eight model patterns instead of calculating the 31 arrangement patterns in a round-robin manner. By using such a model pattern, it is possible to reduce the necessary amount of calculation for determining the holding posture and the holding position of the holder 200. Accordingly, it is possible to reduce a calculation load and speed up calculations necessary for generation of the holding plan.

Here, a shape and a size of a region necessary for the surface of the object O when each model pattern is used is set as a necessary region RN for each model pattern. This necessary region RN is registered in the model pattern DB 352 in association with the corresponding model pattern.

<First Step of Model Pattern Selection>

Figure 9:
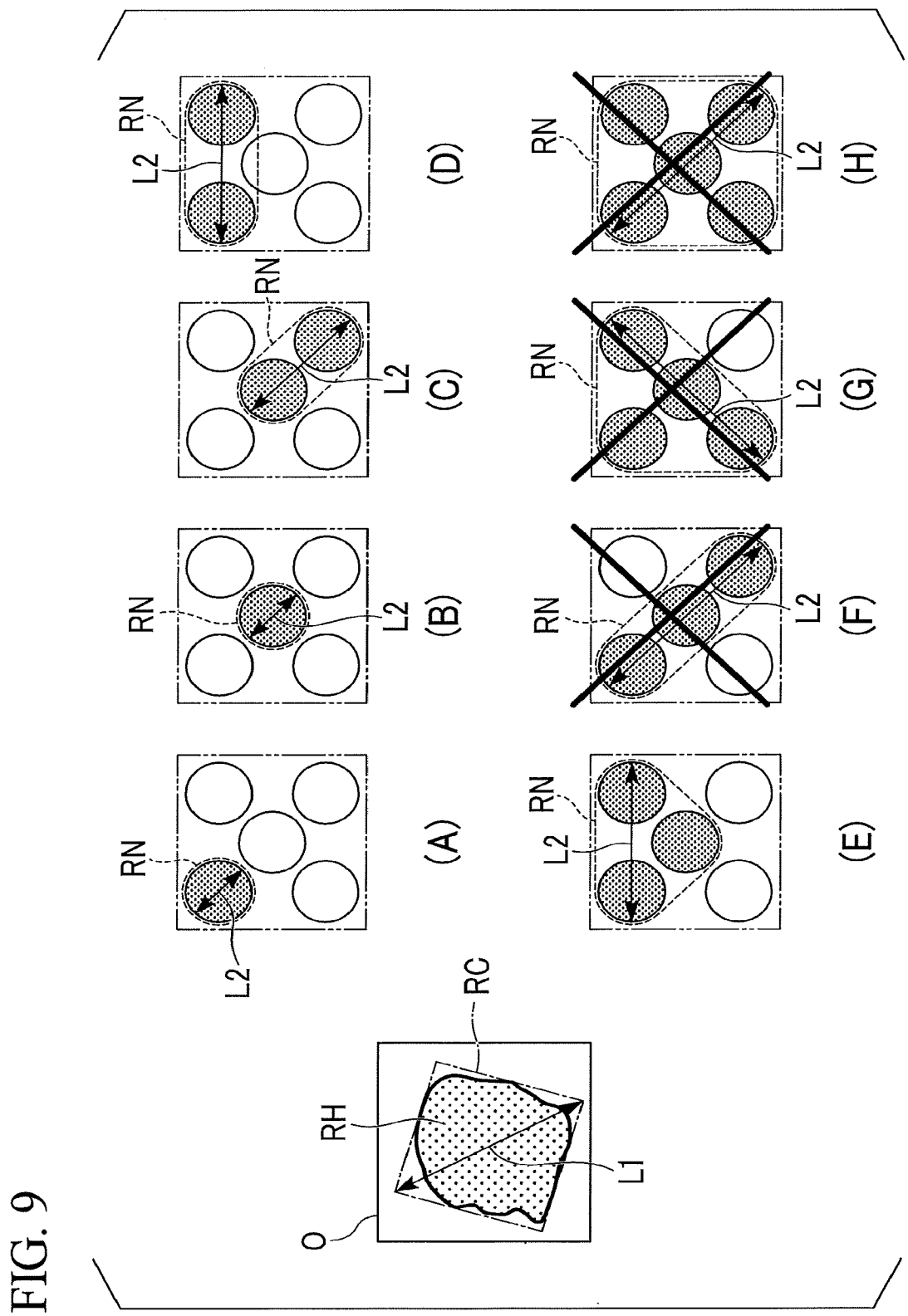
FIG. 9 is a diagram showing a first step of model pattern selection according to the first embodiment.

First, a first step of model pattern selection will be described. FIG. 9 is a diagram showing the first step of the model pattern selection. In the first step, the first determiner 331 excludes one or more model pattern in which the necessary region RN is not included in the holdable region RH (that is, a model pattern in which all the effective suckers 205E are not disposed within the holdable region RH) from among the eight model patterns based on the holdable region information and the information indicating the necessary region RN in each model pattern. For example, the first determiner 331 compares a size of the holdable region RH with a size of the necessary region RN in each model pattern, and determines whether or not the model pattern is a model pattern in which the necessary region RN is included in the holdable region RH.

For example, in the example shown in FIG. 9, a diagonal length L1 of a long side and a short side of a quadrangle circumscribing the holdable region RH is 135 mm, and a length L2 in a longitudinal direction of the necessary region RN in a model pattern of F is 150 mm. Therefore, the model pattern of F is excluded as a model pattern in which the necessary region RN is not included in the holdable region RH. Similarly, model patterns G and H are excluded as model patterns in which the necessary region RN is not included in the holdable region RH.

<Second Step of Model Pattern Selection>

Figure 10:
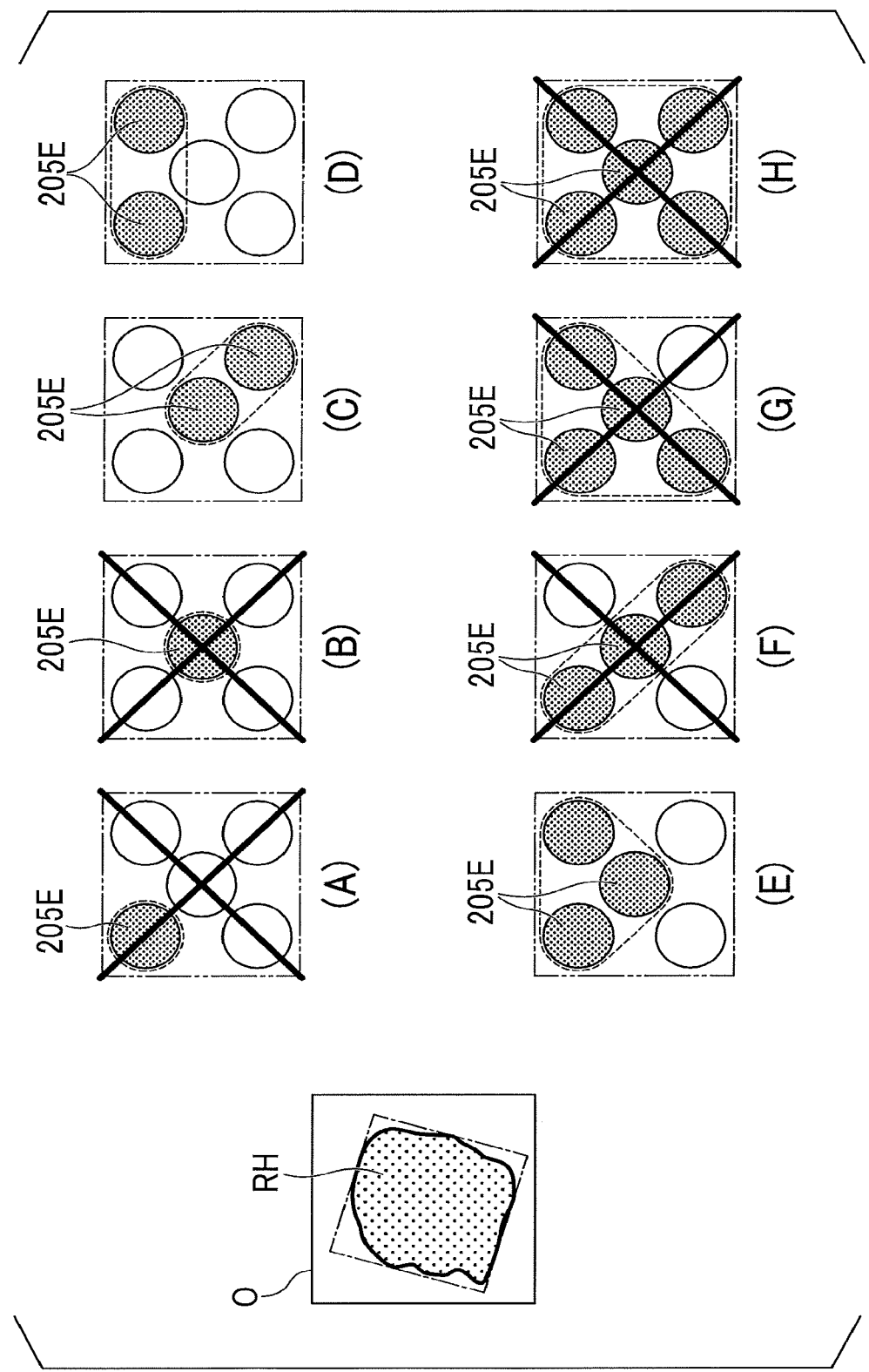
FIG. 10 is a diagram showing a second step of model pattern selection according to the first embodiment.

Next, a second step of the model pattern selection will be described. FIG. 10 is a diagram showing the second step of the model pattern selection. In the second step, the first determiner 331 excludes a model pattern that cannot hold the object O in terms of weight (that is, a model pattern in which the number of effective suckers 205E is insufficient) based on the object weight information and information indicating a weight that can be held by each of the suckers 205. For example, the first determiner 331 multiplies the number of the effective suckers 205E in each model pattern by the weight that can be held by each of the suckers 205 to calculate the weight that can be held by the holder 200 in each model pattern. The first determiner 331 compares the calculated weight that can be held by the holder 200 with the weight of the object O, and determines that the object O can be held using the model pattern in a case where the weight that can be held by the holder 200 is greater than the weight of the object O. Accordingly, the first determiner 331 further narrows down the model patterns capable of holding the object O in terms of weight from among the one or more model patterns narrowed down in the first step.

For example, in the example shown in FIG. 10, the weight of the object O is about 3 kg, and the weight that can be held by each sucker 205 is about 2 kg. Therefore, model patterns A and B are excluded as model patterns that cannot hold the object O from among the five model patterns (A, B, C, D, and E) left in the first step.

The first determiner 331 selects one or more model patterns from among the eight model patterns by performing narrowing-down in the first step and the second step. It should be noted that the process of the first step and the process of the second step may be executed in a reverse order.

<Process of Determining Holdable Posture and Holdable Position>

Next, a process of determining the holdable posture and the holdable position will be described. Here, the process of determining the holdable posture and the holdable position regarding the model pattern of C in FIG. 10 will be described as a representative example for convenience of description. It should be noted that the same process is performed on each of the other model patterns (for example, model patterns D and E in the example shown in FIG. 10) left in the selection of the model pattern described above.

In the embodiment, a determination of the holdable posture and the holdable position of the holder 200 is performed through convolution using bit map data indicating the shape and size of the holdable region RH and bit map data indicating a shape, a size, and a position of the effective sucker 205E in each model pattern.

Figure 11A:
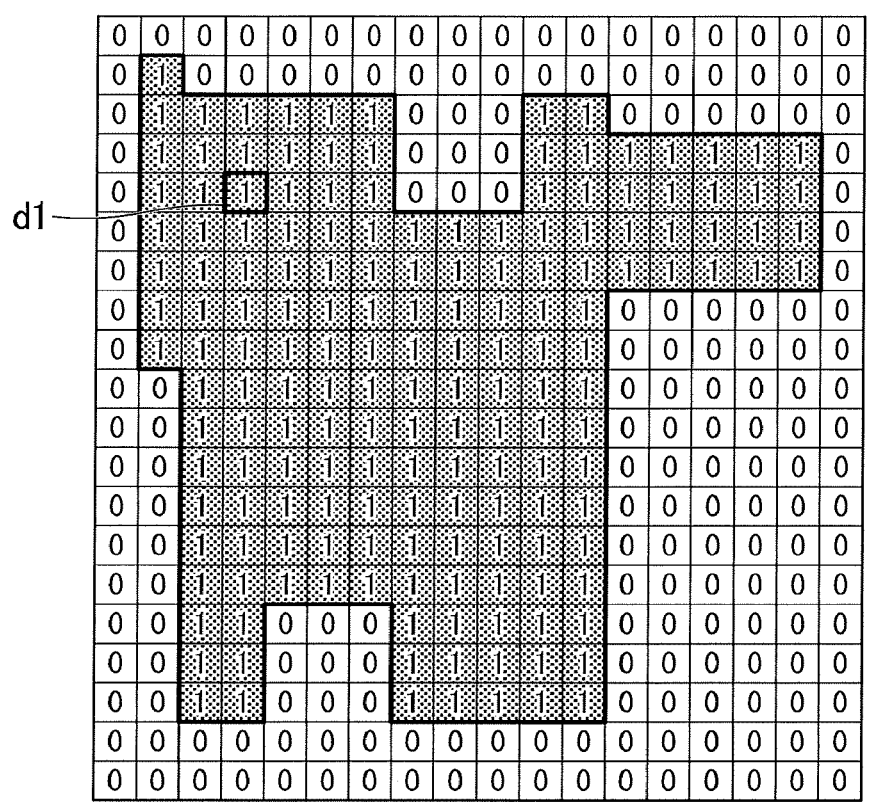
FIG. 11A is a diagram showing an example of bitmap data showing a shape and a size of a holdable region of the first embodiment.

FIG. 11A shows an example of bitmap data showing the shape and size of the holdable region RH. This bitmap data is an example of the "holdable region information". The bit map data shown in FIG. 11A, for example, is binarized, "1" is registered at a coordinate position corresponding to the inside of the holdable region RH, and "0" is registered at a coordinate position corresponding to the outside of the holdable region RH. In the embodiment, an outer shape of a quadrangle shown in FIG. 11A corresponds to the outer shape of the calculation target region RC. That is, the bitmap data of FIG. 11A corresponds not to the entire region of one surface of the surfaces of the object O but to a region inside the calculation target region RC. The outer shape of the calculation target region RC is obtained based on the "calculation target region information" described above. By limiting the calculation target region RC to a partial region of the surface of the object O in this way, it is possible to reduce the necessary amount of calculation as compared with the case in which the calculation of the convolution is performed on the entire region of one surface among the surfaces of the object O. Accordingly, it is possible to reduce a calculation load and speed up calculations necessary for generation of the holding plan.

Figure 11B:
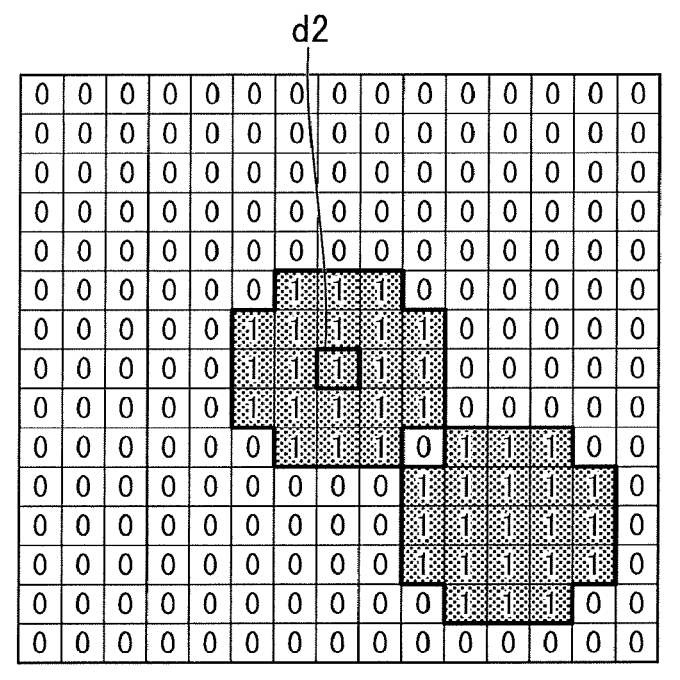

FIG. 11B shows an example of bitmap data showing the shape, the size, and the position of the effective suckers 205E corresponding to the model pattern of C in FIG. 10. This bitmap data is an example of "information indicating the positions of the effective suckers in the model pattern". The bitmap data shown in FIG. 11B, for example, is binarized. "1" is registered at a coordinate position corresponding to the inside of the effective sucker 205E, and "0" is registered at a coordinate position corresponding to the outside of the effective sucker 205E. An outer shape of a quadrangle shown in FIG. 11B corresponds to the outer shape of the holder 200.

Figure 11C:
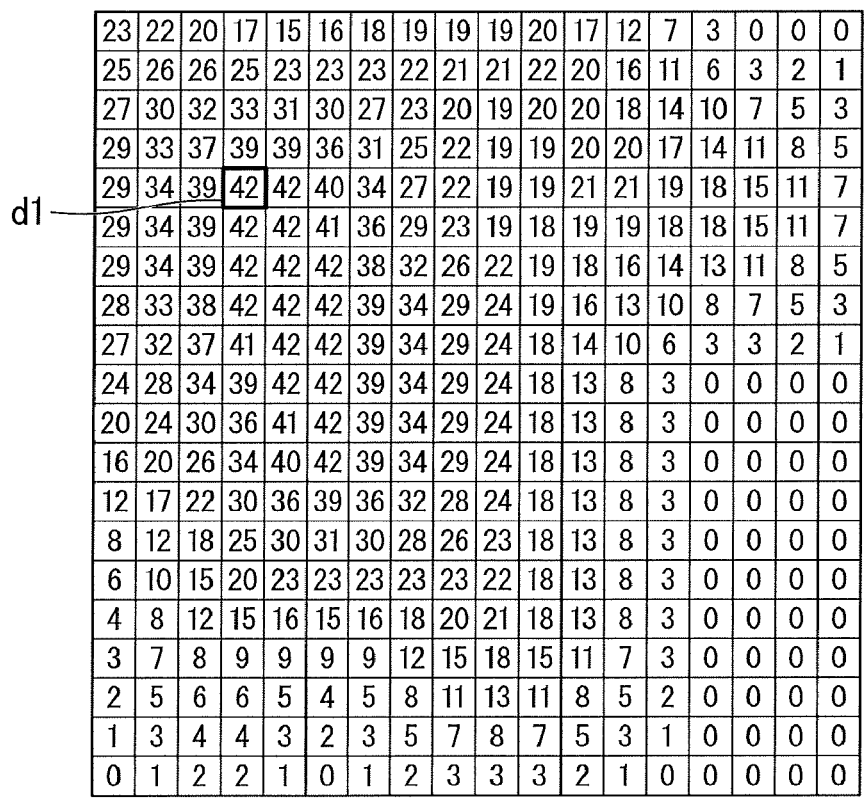
FIG. 11C is a diagram showing an example of bit map data of a calculation result of a convolution according to the first embodiment.

FIG. 11C shows an example of bitmap data of a calculation result of convolution using bitmap data showing the shape and the size of the holdable region RH shown in FIG. 11A and bitmap data showing the shape, the size, and the position of the effective suckers 205E shown in FIG. 11B. For example, a numerical value "42" at a coordinate position d1 in FIG. 11C is a result of calculation in a case where the convolution is performed while matching the coordinate position d2 in FIG. 11B (the center of the holder 200) with the coordinate position d1 in FIG. 11A. In the first embodiment, an outer shape of a quadrangle shown in FIG. 11C corresponds to the outer shape of the calculation target region RC, as in FIG. 11A. In the first embodiment, the convolution is performed on each of all the coordinate positions included in the calculation target region RC.

Figure 11D:
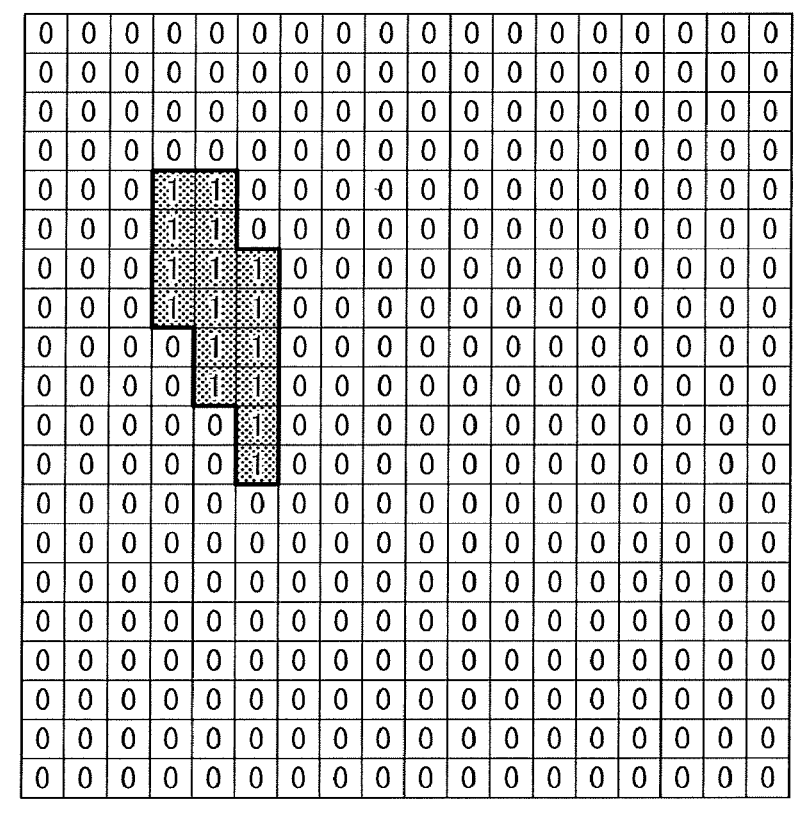

FIG. 11D shows an example of bit map data in which the calculation result shown in FIG. 11C is binarized. In the first embodiment, a bitmap table shown in FIG. 11D is data in which "1" is registered for a coordinate position indicating the maximum value ("42" in the above example) in the calculation result of the convolution shown in FIG. 11C, and "0" is registered for a coordinate position indicating other values. Each of the coordinate positions at which "1" is registered in the bitmap data in FIG. 11D is a coordinate position (a holdable position) at which all the effective suckers 205E are disposed within the holdable region RH in a case where a center of the holder 200 is aligned with this coordinate position.

It should be noted that the process described with reference to FIGS. 11A to 11D is a calculation result of convolution for a certain holding posture regarding the model pattern of C in FIG. 10. The process described with reference to FIGS. 11A to 11D is performed on each of a plurality of holding postures in which the holder 200 is rotated at a predetermined angle in the θ direction with respect to the object O (that is, a plurality of holding postures in which angular positions of the holder 200 with respect to the object O are different from each other). The predetermined angle may be a small angular interval such as 1 degree or 5 degrees, or may be a large angular interval such as 30 degrees, 45 degrees, or 60 degrees. It should be noted that although FIGS. 11A to 11D show an example in which relatively coarse bitmap data is used for convenience of description, the positions of the effective suckers 205E in a case where the holder 200 is rotated at a predetermined angle may be indicated using relatively fine bitmap data.

It should be noted that a verification range of the holding posture in which it is necessary for the calculation to be performed differs according to the model patterns. That is, in a case where the model pattern does not have rotational symmetry of 360 degrees or less (for example, the model pattern of E or U shown in FIG. 8), it is necessary for the above process to be performed on each of a plurality of holding postures obtained by rotating the holder 200 at a predetermined angle in a range of 360 degrees. On the other hand, in a case where the model pattern has rotational symmetry of 360 degrees or less (for example, the model pattern of C and D shown in FIG. 8), the above process may be performed on each of a plurality of holding postures obtained by rotating the holder 200 at a predetermined angle only in a range of angles (for example, 90 degrees) smaller than 360 degrees.

Incidentally, there may also be a holding posture in which not all of the effective suckers 205E are disposed within the holdable region RH among a plurality of holding postures in which the holder 200 is rotated at a predetermined angle with respect to the object O. In a case where a maximum value of the calculation result of the convolution is smaller than a value ("42" in the example shown in FIG. 11C) calculated in a case where all the effective suckers 205E are disposed within the holdable region RH), the first determiner 331 determines that the holding posture is a posture in which all the effective suckers 205E are not disposed within the holdable region RH, and does not determine that holding posture as a holdable posture.

Through the above process, the first determiner 331 extracts a plurality of holding postures in which all the effective suckers 205E are arranged in the holdable region RH. The first determiner 331 determines the plurality of extracted holding postures and the holding positions at which all the effective suckers 205E are disposed within the holdable region RH in each holding posture to be the holdable postures and the holdable positions that are evaluation targets of the evaluator 332.

It should be noted that the first determiner 331 may determine a plurality of holdable postures in which all the effective suckers 205E are disposed within the holdable region RH and the holdable positions at which all the effective suckers 205E are disposed within the holdable region RH in each holdable posture based on an inclusive detection using vertex information that defines the outer shape of the holdable region RH, or other calculations instead of the convolution.

(Process of Evaluator)

Figure 12:
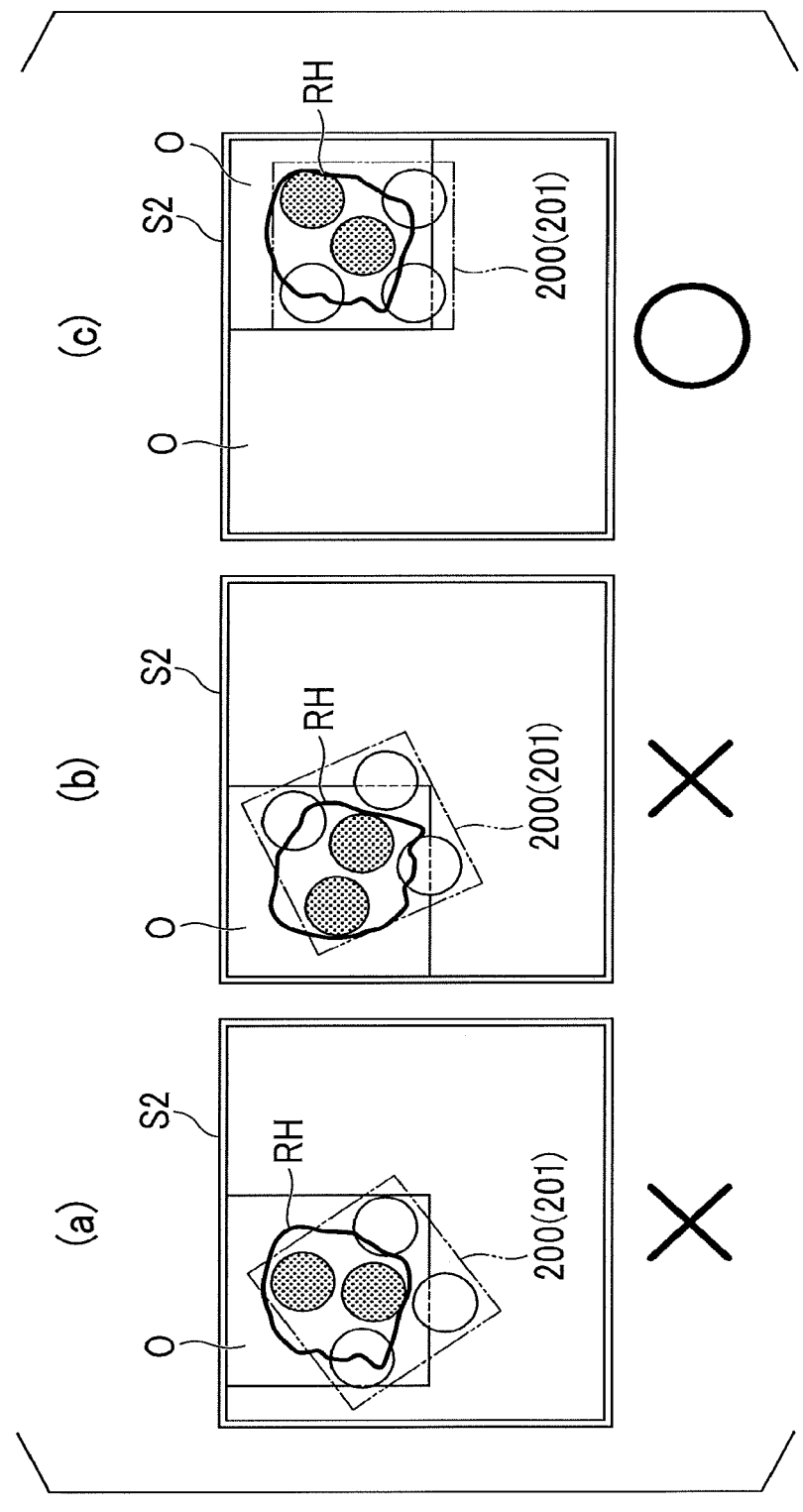
FIG. 12 is a view showing a plurality of holding postures and packing densities according to the first embodiment.

Next, the evaluator 332 will be described. Here, superiority or inferiority of various holding postures of the holder 200 when the object O is moved within the movement destination container S2 (so-called packing is performed) will be described. FIG. 12 is a diagram showing a plurality of holding postures and box packing densities according to the holding postures. (a) in FIG. 12 shows the holding posture in which the holder 200 protrudes from three sides of the outer shape of the object O. In this holding posture, it is difficult for the object O to be packed into a corner of the movement destination container S2 due to the holder 200 interfering with the movement destination container S2. (b) in FIG. 12 shows the holding posture in which the holder 200 protrudes from two sides of the outer shape of the object O. In this holding posture, although the object O can be packed into the corner of the movement destination container S2, it may be difficult for another object O to be packed densely with respect to a previously placed object O. (c) in FIG. 12 shows a holding posture in which the holder 200 protrudes only from one side of the outer shape of the object O. In this holding posture, it is relatively easy to pack the object O into a corner of the movement destination container S2, and it is relatively easy to pack another object O densely with respect to a previously placed object O. Therefore, it can be said that the holding posture shown in (c) is preferable among the plurality of holding postures of (a) to (c) in FIG. 12.

In the first embodiment, the evaluator 332 evaluates protrusion of the holder 200 from the outer shape of the object O for each of the plurality of holdable postures determined by the first determiner 331 based on information indicating the outer shape of the object O (the "object outer shape information" described above) and information indicating the outer shape of the holder 200 (the "holder outer shape information" described above). Further, in the first embodiment, the evaluator 332 evaluates protrusion of the holder 200 from the outer shape of the object O at each of the plurality of holdable positions, for each of the plurality of holdable postures.

Specifically, in the first embodiment, the evaluator 332 evaluates the protrusion of the holder 200 from the outer shape of the object O based on an amount of protrusion of the holder 200 from the outer shape of the object O. For example, the "amount of protrusion" is the number of sides of the outer shape of the object O from which the holder 200 protrudes in a case where the outer shape of the object O is regarded as a polygon (for example, in a case where the outer shape of the object O is registered as a polygon or a shape approximating a polygon). In another example, the amount of protrusion is an area of a portion of the holder 200 protruding from the outer shape of the object O.

FIG. 13 is an example of bit map data showing the number of sides of the outer shape of the object O from which the holder 200 protrudes. That is, in a case where a center of the holder 200 is aligned with a coordinate position, the number of sides of the outer shape of the object O from which the holder 200 protrudes is registered at respective coordinate positions of the bitmap data shown in FIG. 13. It should be noted that the coordinate positions of the bitmap data of FIG. 13 correspond to the coordinate positions of the bitmap data of FIG. 11D. Such bitmap data is generated by the evaluator 332 based on the object outer shape information and the holder outer shape information.

FIG. 14 shows an example of bit map data showing a set of holdable positions at which the amount of protrusion is minimized regarding one holdable posture. For example, FIG. 14 shows bitmap data obtained by extracting, from the bitmap data of FIG. 13, only the numerical value of the coordinate position at which a minimum numerical value (the number of sides from which the holder 200 protrudes) is registered in the bitmap data of FIG. 13 among a plurality of coordinate positions of the bitmap data of FIG. 13 corresponding to the plurality of coordinate positions (the plurality of holdable positions) at which "1" is registered in the bitmap data of FIG. 11D.

That is, in the example shown in FIG. 14, there is no coordinate position at which "2" is registered in the bitmap data in FIG. 13 among the plurality of coordinate positions of the bitmap data of FIG. 13 corresponding to the plurality of coordinate positions at which "1" is registered in the bitmap data of FIG. 11D. Therefore, the numerical value ("1") of the coordinate position at which "1" is registered in the bitmap data of FIG. 13 among a plurality of coordinate positions of the bitmap data of FIG. 13 corresponding to the plurality of coordinate positions at which "1" is registered in the bitmap data of FIG. 11D is extracted from the bit map data of FIG. 13. The bitmap data as shown in FIG. 14 is generated by the evaluator 332, for example.

The evaluator 332 specifies a minimum value of the amount of protrusion (for example, a minimum value of the number of sides of the outer shape of the object O from which the holder 200 protrudes) and the holdable positions at which the amount of protrusion is a minimum value in the holdable posture that corresponds to the bitmap data based on the bitmap data as shown in FIG. 14. In the example shown in FIG. 14, the evaluator 332 specifies that the minimum value of the number of sides of the holder 200 protruding from the outer shape of the object O is "1", and that the number of sides of the outer shape of the object O from which the holder 200 protrudes is a minimum value at a plurality of coordinate positions (a plurality of holdable positions) at which "1" is registered in FIG. 14. The evaluator 332 outputs, to the second determiner 333, information indicating the specified minimum value of the amount of protrusion and the holdable positions at which the amount of protrusion is a minimum value in the holdable posture.

Here, the first determiner 331 may determine a plurality of holdable postures in which angular positions of the holders 200 are different with respect to the object O in some cases, as described above. In this case, the evaluator 332 performs the above-described process (the process of the evaluator 332) on each of the plurality of holdable postures determined by the first determiner 331, and specifies a minimum value of the amount of protrusion in the holdable posture and the holdable positions in which the amount of protrusion is the minimum value in the holdable posture with respect to each of the plurality of holdable postures.

It should be noted that, in a case where a plurality of model patterns (model patterns C, D, and E in the example shown in FIG. 10) are selected in the selection of the model pattern described above, the above-described process (the process of the evaluator 332) is performed on all the selected model patterns.

Further, in a case where the holdable posture is determined using a model pattern limited based on the symmetry of the arrangement positions of the plurality of suckers 205 and the like, the evaluator 332 performs the above-described process (the process of the evaluator 332) on each of the plurality of arrangement patterns of the suckers 205 before the limitation which are the basis of the model pattern, and specifies the minimum value of the amount of protrusion in the holdable posture in each arrangement pattern and the holdable positions in which the amount of protrusion is the minimum value in a holdable posture for each of the plurality of arrangement patterns before the limitation.

(Process of Second Determiner)

Next, the second determiner 333 will be described. The second determiner 333 determines the holding posture and the holding position of the holder 200 to be adopted from among the plurality of holdable postures and the plurality of holdable positions determined by the first determiner 331 based on the evaluation results of the evaluator 332. For example, the second determiner 333 determines the holding posture and the holdable position of the holder 200 from the plurality of holdable postures and the plurality of holdable positions so that the amount of protrusion satisfies a first condition.

"Satisfy a first condition" indicates, for example, the holdable posture in which the amount of protrusion is minimized or equal to or smaller than a predetermined value among the plurality of holdable postures determined by the first determiner 331. As described above, in a case where the outer shape of the object O is regarded as, for example, a polygon, the amount of protrusion is the number of sides of the outer shape of the object O from which the holder 200 protrudes. In another example, the amount of protrusion is an area of a portion of the holder 200 protruding from the outer shape of the object O.

In a case where the amount of protrusion is the number of sides of the outer shape of the object O from which the holder 200 protrudes, "satisfying a predetermined first condition" indicates, for example, the holdable posture in which the number of sides from which the holder 200 protrudes in the outer shape of the object O is minimized or equal to or smaller than a predetermined number (for example, equal to or smaller than 1) among the plurality of holdable postures. However, "equal to or smaller than a predetermined number" is not limited to "equal to or smaller than 1", and may be set to "equal to or smaller than 2" and may be set to be equal to or smaller than other numbers based on a type of a polygon to which the holder 200 is approximated.

Figure 15:
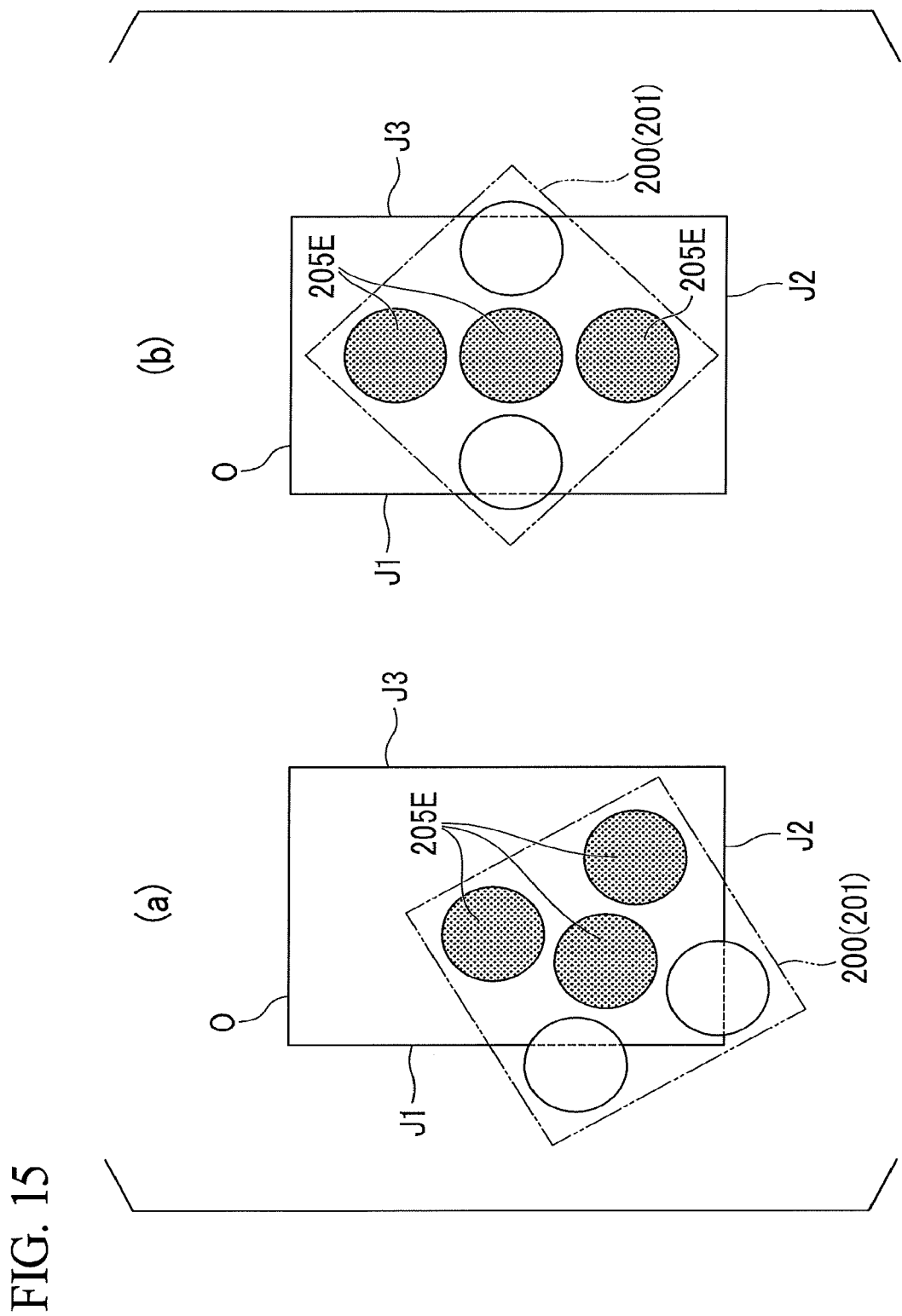
FIG. 15 is a view showing an example of a plurality of holdable postures of the holder according to the first embodiment.

Here, in a case where the holder 200 protrudes from two sides of the outer shape of the object O, the second determiner 333 may determine the holdable posture in which the two sides are continuous with each other to be a holding posture of the holder 200 in preference to a holdable posture in which the two sides are not continuous with each other. FIG. 15 is a diagram showing an example of a plurality of holdable postures of the holder 200. "The two sides are continuous with each other" means that, for example, as shown in (a) in FIG. 15, two sides J1 and J2 of the outer shape of the object O from which the holder 200 protrudes are continuous with each other (are connected to each other). On the other hand, "the two sides are not continuous with each other" means that, for example, as shown in (b) in FIG. 15, two sides J1 and J3 of the outer shape of the object O from which the holder 200 protrudes are not continuous with each other (for example, are opposite sides).

On the other hand, in a case where the amount of protrusion is the area of the portion of the holder 200 protruding from the outer shape of the object O, "satisfying the predetermined first condition" means that the area of the portion of the holder 200 protruding from the outer shape of the object O is a minimum value or is equal to or smaller than a predetermined value.

It should be noted that the amount of protrusion may be calculated based on both "the number of sides of the outer shape of the object O from which the holder 200 protrudes" and "the area of the portion of the holder 200 protruding from the outer shape of the object O".

Further, the evaluator 332 may specify at least one of a direction in which the holder 200 should not protrude from the outer shape of the object O and a side of the object O from which the holder 200 should not protrude, based on the information on the movement destination S2 of the object O (for example, the "movement destination shape information" and the "movement destination loading information" described above), and increase a weight for the amount of protrusion of the holder 200 relating to the at least one of the specified direction and the specified side of the object O. "Increase a weight" described herein means making a holding posture of the holder 200 more difficult to be adopted. Thus, it is possible to suppress selection of the holding posture in which the outer shape of the holder 200 protrudes in the specified direction or from the specified side of the object O.

Further, the evaluator 332 may set constraint conditions regarding the holding posture and holding position of the holder 200 based on the information on the movement source of the object O (for example, the "movement source shape information" described above), and select the holding posture and the holding position of the holder 200 under the restriction conditions.

Through the process described above, the holding plan generator 330a determines the holding posture and the holding position of the holder 200. The holding plan generator 330a outputs the determined holding posture and holding position as a control target to the operation controller 340.

Next, the movement plan generator 330b will be described. The movement plan generator 330b generates a movement plan to move the object O held by the holder 200 to the movement destination S2 based on the information on the movement destination S2 of the object O (for example, the "movement destination shape information" and the "movement destination loading information" described above). In the first embodiment, the movement plan generator 330b generates the movement plan based on the holding posture and the holding position determined by the holding plan generator 330a. For example, the movement plan generator 330b generates a movement plan in which a direction in which the holder 200 does not protrude from the outer shape of the object O or the side of the object O from which the holder 200 does not protrude is adjacent to the inner wall surface of the movement destination container S2 or a previously placed object O.

Next, the operation controller 340 will be described. The operation controller 340 controls the holder 200 and the moving mechanism 100 based on the holding plan and the movement plan that are planned by the planner 330. For example, the operation controller 340 controls the moving mechanism 100 and the holder 200 based on the holding plan generated by the holding plan generator 330a, and holds the object O with the holding posture and the holding position of the holder 200 determined by the holding plan generator 330a. The operation controller 340 controls the moving mechanism 100 and the holder 200 based on the movement plan generated by the movement plan generator 330b to move the object O into the movement destination container S2.

Figure 16:
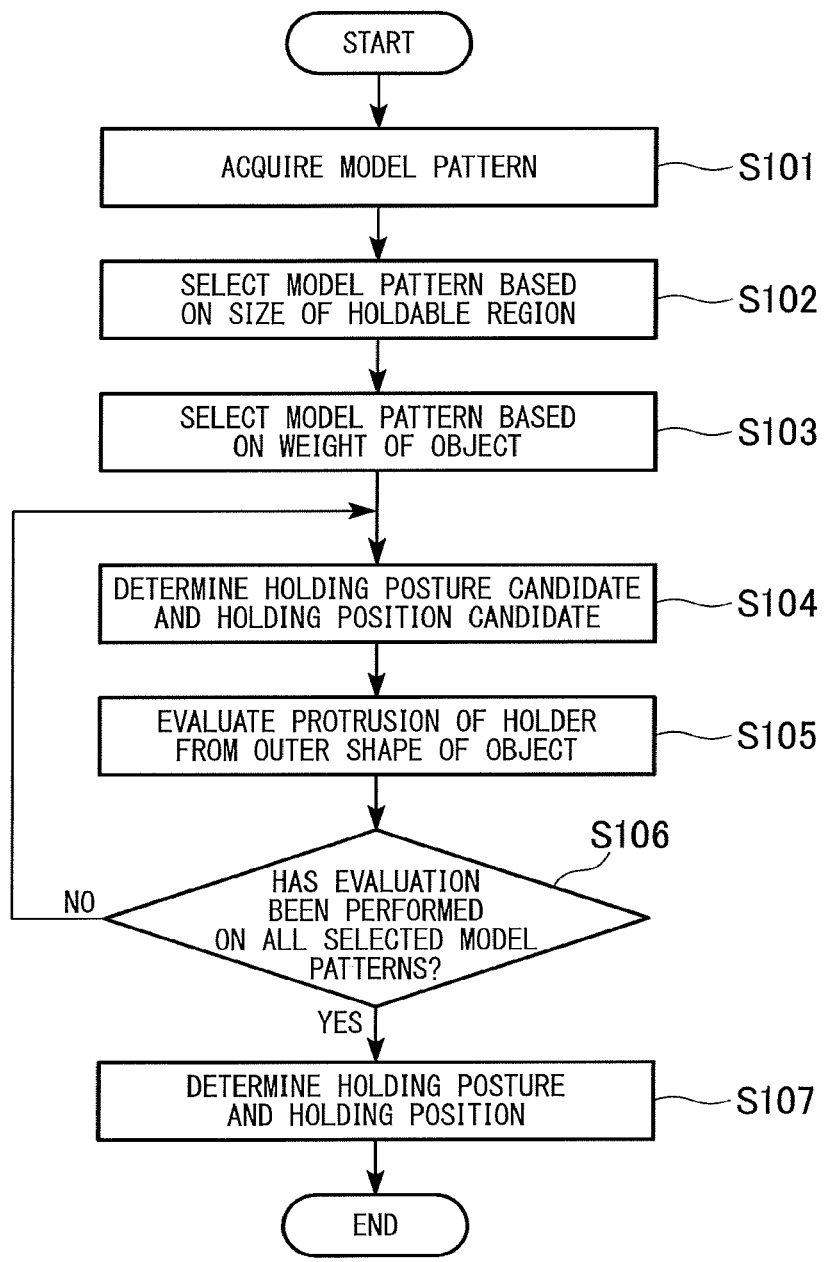
FIG. 16 is a flowchart showing an example of a process flow of a controller according to the first embodiment.

Next, an example of a process flow of the controller 300 will be described. FIG. 16 is a flowchart showing an example of a flow of a process of the controller 300. First, the first determiner 331 acquires a plurality of model patterns limited based on the symmetry of the arrangement positions of the suckers 205 and the like from the storage 350 (S101). It should be noted that the model pattern may be derived every time by the first determiner 331 instead of being acquired from the storage 350.

Then, the first determiner 331 selects the model patterns in which all valid suckers 205E are arranged within the holdable region RH from among the plurality of model patterns based on the holdable region information and the information indicating the position of the effective sucker 205E in each model pattern (S102). That is, the first determiner 331 performs a process of the first step of the model pattern selection described above.

Then, the first determiner 331 also selects the model patterns that can hold the weight of the object O from among the plurality of model patterns selected in the first step based on the object weight information and the information indicating the weight that can be held by each sucker 205 (S103). That is, the first determiner 331 performs a process of the second step of the model pattern selection described above.

Then, the first determiner 331 determines the holdable posture and the holdable position of the holder 200 for each of one or more (for example, a plurality of) model patterns selected through the first step and the second step (S104). For example, the first determiner 331 first selects one model pattern. The first determiner 331 determines one or more (for example, a plurality of) holdable posture of the holder 200 and one or more (for example, a plurality of) holdable positions in each holdable posture, for the selected model pattern.

Then, the evaluator 332 evaluates protrusion of the holder 200 from the outer shape of the object O at each of one or more (for example, a plurality of) holdable positions in each holdable posture with respect to each of one or more (a plurality of) holdable postures of the holder 200 (S105). In the first embodiment, for example, the number of sides of the outer shape of the object O from which the holder 200 protrudes is calculated.

Then, the evaluator 332 determines whether or not the processes of S104 and S105 have been performed on all the model patterns selected through the first and second steps (S106). In a case where it is determined that the processes of S104 and S105 have been performed on all the selected model patterns, the process proceeds to S107. On the other hand, in a case where it is determined that there is the model pattern on which the processes of S104 and S105 have not been performed among all the model patterns, the processes of S104 and S105 are performed on such a model pattern. Accordingly, the evaluator 332 repeats the processes of S104 and S105 so that the processes of S104 and S105 are performed on all the model patterns.

Next, the second determiner 333 determines the holding posture and the holding position in which the amount of protrusion from the object O satisfies the first condition (for example, the number of sides of the outer shape of the object O from which the holder 200 protrudes is a minimum or equal to or smaller than the predetermined number) among the holding postures and the holding positions evaluated by the evaluator 332 to be the holding posture and the holding position to be adopted (S107). The second determiner 333 outputs information indicating the determined holding posture and determined holding position to the operation controller 340.

It should be noted that, in a case where the holdable posture and the holdable position in which the preset first condition is satisfied (for example, the number of sides of the outer shape of the object O from which the holder 200 protrudes becomes equal to or smaller than the predetermined number) are found even in a step in which the processes of S104 and S105 for all the model patterns in the evaluator 332 are not ended (more specifically, in a step in which the processes of S104 and S105 for the plurality of holdable postures regarding the first selected model pattern are not ended), the second determiner 333 may end the evaluation in the evaluator 332 at that time, and determine the found holdable posture and the found holdable position to be the holding posture and the holding position to be adopted. According to such a process, it is possible to reduce a calculation load and speed up calculations necessary for generation of the holding plan.

According to such a configuration, it is possible to pack the objects O that is a transport target densely. For example, in a case where the object is moved into the movement destination container (so-called packing is performed), it may be desirable to pack the object, which is a transport target, densely with respect to the inner wall surface of the movement destination container or the previously placed object while controlling the object and the holder not to interfere with the surroundings in order to improve a filling rate of the movement destination container. However, in a general transport device, the holding posture with respect to the object is often determined while focusing only on the easiness of holding the object at the movement source, and the holding posture at the time of packing is not considered. Therefore, the holder interferes with the movement destination container or the previously placed object at the time of packing, and the position at which the object is placed is restricted. Accordingly, a filling rate of the packing may decrease. Further, generally, the holder performing the packing operation is often smaller than the outer shape of the object, and the holder 200 larger than the outer shape of the object O as in this embodiment is not considered.

On the other hand, in the first embodiment, the holding device 10 includes the controller 300 that determines the holding posture and the holding position of the holder 200 with respect to the object O in order to reduce the interference of the holder 200 with the inner wall surface of the movement destination container S or the previously placed object O. According to such a configuration, it is difficult for the holder 200 to interfere with the movement destination container S2 or the previously placed object O, and it is difficult for the position at which the object O is placed to be restricted. Therefore, it is easy for the object O, which is a transport target, to be packed densely with respect to the inner wall surface of the movement destination container S2 and the previously placed object O. As a result, it is possible to improve a filling rate of the packing. The improvement of the filling rate of the packing makes it possible to improve transport efficiency and reduce a transport cost.

In the first embodiment, the holding device 10 includes the first determiner 331, the evaluator 332, and the second determiner 333. The first determiner 331 determines a plurality of holdable postures of the holder 200 with respect to the object O based on the information indicating the holdable region RH. The evaluator 332 evaluates the protrusion of the holder 200 from the outer shape of the object O for each of the plurality of holdable postures based on information indicating the outer shape of the object O. The second determiner 333 determines the holding posture of the holder 200 from among the plurality of holdable postures based on the evaluation of the evaluator 332. According to such a configuration, it is possible for the evaluator 332 to evaluate each of a plurality of holdable postures capable of holding the object O, and it is possible to determine a more suitable holding posture. Accordingly, it may be possible to further pack the object O densely.

In the first embodiment, the first determiner 331 determines a plurality of holdable positions of the holder 200 with respect to the object O in each of the plurality of holdable postures. The evaluator 332 evaluates protrusion of the holder 200 from the outer shape of the object O at each of the plurality of holdable positions for each of the plurality of holdable postures. The second determiner 333 determines the holding posture and the holding position of the holder 200 based on the evaluation of the evaluator 332. According to such a configuration, it is possible for the evaluator 332 to perform the evaluation on each of the plurality of holdable positions in each holdable posture, in addition to the plurality of holdable postures, and it is possible to determine a more suitable holding posture and holding position.

In the first embodiment, the evaluator 332 evaluates an amount of protrusion of the holder 200 from the outer shape of the object O. The second determiner 333 determines the holding posture and the holding position of the holder 200 so that the amount of protrusion of the holder 200 from the outer shape of the object O satisfies the first condition. According to such a configuration, the holding posture and the holding position in which the amount of protrusion from the outer shape of the object O is relatively small are determined. Accordingly, the objects O can be packed more densely in some cases.

In the first embodiment, the amount of protrusion may be the number of sides of the outer shape of the object O from which the holder 200 protrudes. According to such a configuration, the holding posture and holding position in which the number of sides of the outer shape of the object O from which the holder 200 protrudes is small are determined. Accordingly, the outer shape of the holder 200 is less likely to become an obstacle, and the objects O can be packed more densely in some cases.

Here, in a case where the holder 200 protrudes from two sides of the outer shape of the second object O, the holdable posture in which the two sides are continuous with each other may be determined to be a holding posture of the holder 200 in preference to the holdable posture in which the two sides are not continuous with each other. According to such a configuration, the object O that is a transport target is easily further packed on an inner wall surface of the movement destination container S2 or on the previously placed object O.

In the first embodiment, the amount of protrusion may be the area of the portion of the holder 200 protruding from the outer shape of the object. According to such a configuration, the holding posture and holding position in which the area of the portion of the holder 200 protruding from the outer shape of the object O is small are determined. Accordingly, the outer shape of the holder 200 is less likely to become an obstacle, and the objects O can be packed more densely in some cases.

Next, several modification examples of the first embodiment will be described. In each of the modification examples, configurations other than those described below are substantially the same as those of the first embodiment.

First Modification Example

A first modification example relates to a transport system 1 in which the outer shape of the object O may be smaller than the outer shape of the holder 200. FIG. 17 shows an example of bit map data showing the number of sides of the outer shape of the object O from which the holder 200 protrudes in a case where the outer shape of the object O is smaller than the outer shape of the holder 200. In a case where the outer shape of the object O is smaller than the outer shape of the holder 200, it is impossible to set the amount of protrusion of the holder 200 from the outer shape of the object O to zero. In such a case, using the bitmap data as shown in FIG. 17, the controller 300 determines the holding posture in which the holder 200 protrudes from the two sides of the outer shape of the object O to be the holding posture of the holder 200.

Second Modification Example

Figure 18:
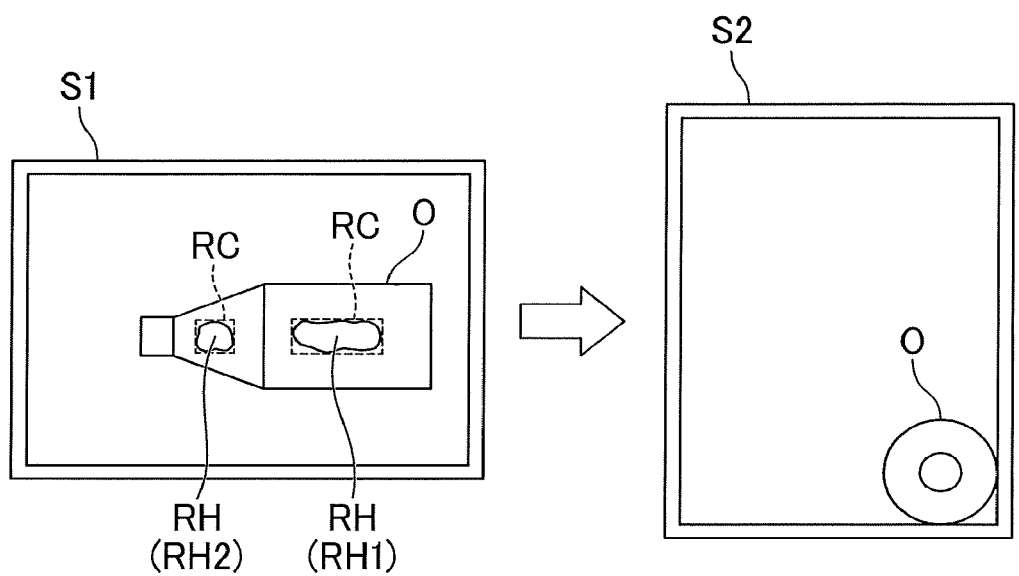
FIG. 18 is a plan view showing an example of a posture of an object at a movement source and an example of a posture of the object at a movement destination according to a second modification example of the first embodiment.

A second modification example relates to a case in which there is a desired posture of the object O at the movement destination S2. FIG. 18 is a plan view showing an example of the posture of the object O at the movement source S1 and an example of the posture of the object O at the movement destination S2. In the example shown in FIG. 18, at the movement source S1, the object C) is in a posture in which the object O is laid. Here, in a case where the posture at the movement destination S2 of the object O is not taken into consideration, the plurality of holdable regions RH1 and RH2 are specified as the holdable regions RH.

Figure 19:
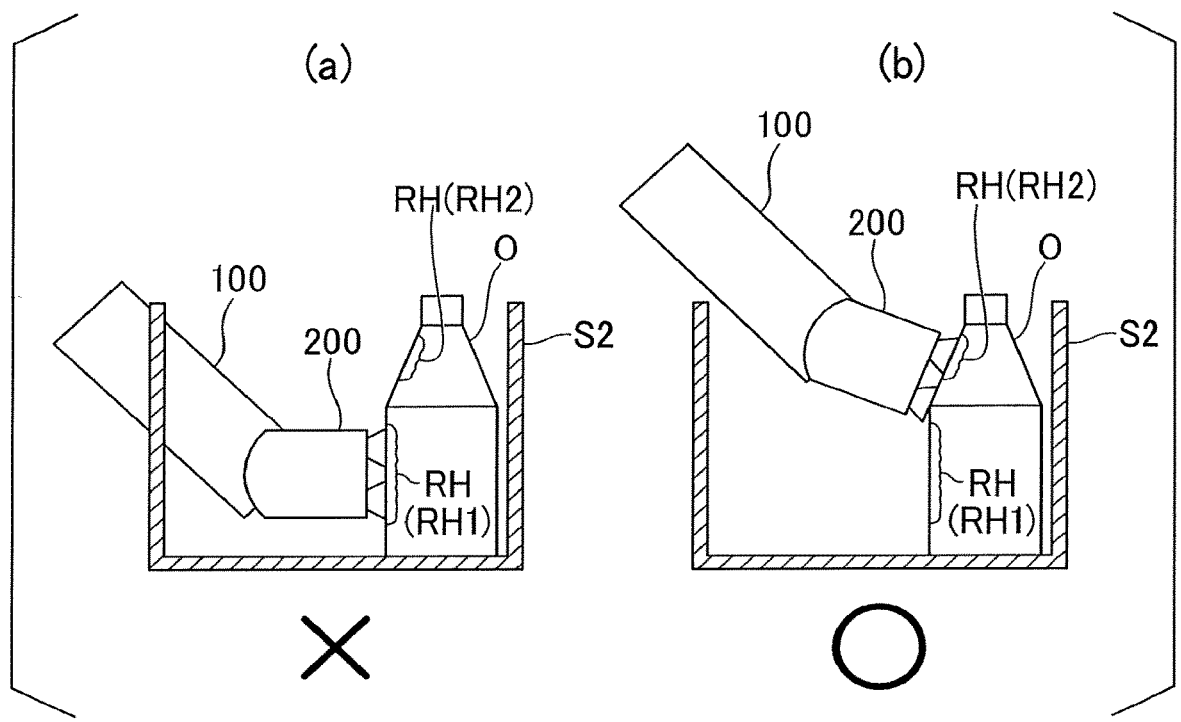
FIG. 19 is a cross-sectional view showing an example of a posture of an object at a movement destination according to the second modification example of the first embodiment.

FIG. 19 is a cross-sectional view showing an example of the posture of the object O at the movement destination S2. In the example shown in FIG. 19, the object O is in a standing posture at the movement destination S2. In this case, in a case where the first holdable region RH1 among the plurality of holdable regions RH is held by the holder 200 at the movement source S1, the holder 200 may interfere with the movement destination container S2 and it may be difficult for the object O to be packed densely (see (a) in FIG. 19).

Therefore, in the second modification example, the evaluator 332 performs weighting in the evaluation calculation of the amount of protrusion (that is, the calculation of the amount of protrusion) based on the information indicating the posture of the object O in the movement destination container S2. For example, in a case where the object O to be placed in a specific posture within the movement destination container S2, the evaluator 332 performs weighting so that the amount of protrusion is increased as the amount of interference between the movement destination container S2 or the previously placed object O and the holder 200 in the posture is increased. Accordingly, the second determiner 333 can determine a holding posture and a holding position in consideration of the specific posture of the object O at the movement destination S2. Accordingly, in a case in which there are a plurality of holdable regions RH (for example, holdable regions RH1 and RH2) in the object O, the second determiner 333 can select the second holdable region RH2 in which the amount of interference between the movement destination container S2 and the holder 200 in the specific posture is relatively smaller in a case where the object O is to be placed in the specific posture at the movement destination container S2 (see (b) in FIG. 19).

It should be noted that the "information indicating the posture of the object in the movement destination container" is obtained, for example, by information detected by the second detector 12 disposed near the movement destination S2 being analyzed by the information analyzer 320. Further, the "information indicating the posture of the object in the movement destination container" may be registered as a part of the object DB 351 in advance. In this case, the information acquirer 310 may determine the type or identification information of the object O based on the feature information of the object O (for example, tag information attached to the object O) included in the image data detected by the first detector 11, and acquire the "information indicating the posture of the object in the movement destination container" registered corresponding to the determined type or identification information of the object O.

Third Modification Example

Figure 20:
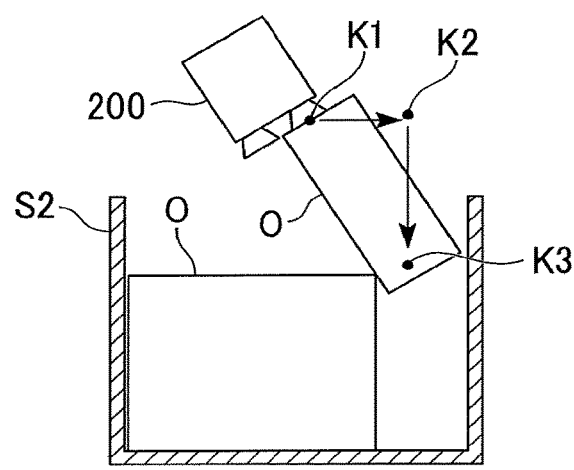
FIG. 20 is a cross-sectional view showing a via point through which an object passes at a movement destination according to a third modification example of the first embodiment.

A third modification example relates to a case in which the object O is accommodated at a final position via one or more via points at the movement destination S2. FIG. 20 is a cross-sectional view showing via points through which the object O passes at the movement destination S2. FIG. 20 shows an example in which the object O is inserted into a gap between an inner wall surface of the movement destination container S2 and a previously placed object O. In such a case, the object O is inserted via several via points K1, K2, and K3 at a gradually changed inclination angle along the previously placed object O (using the object O as a fulcrum) such that it is easy for the object O to be smoothly inserted in some cases.

Therefore, in the third modification example, the evaluator 332 performs weighting in the evaluation and calculation of the amount of protrusion (that is, the calculation of the amount of protrusion) based on the information indicating the via points K1, K2, and K3 through which the object O passes at the movement destination container S2. For example, the evaluator 332 performs weighting so that the amount of protrusion becomes larger as the amount of interference between the moving movement destination container S2 or the previously placed object O and the holder 200 at each of the via points K1, K2, and K3 increases. Accordingly, the second determiner 333 can determine the holding posture and the holding position in consideration of the via points K1, K2, and K3 during the movement of the object O. The "information indicating via points through which the object passes in the movement destination container" is derived, for example, based on the movement destination shape information and the movement destination loading information described above.

Fourth Modification Example

Figure 21:
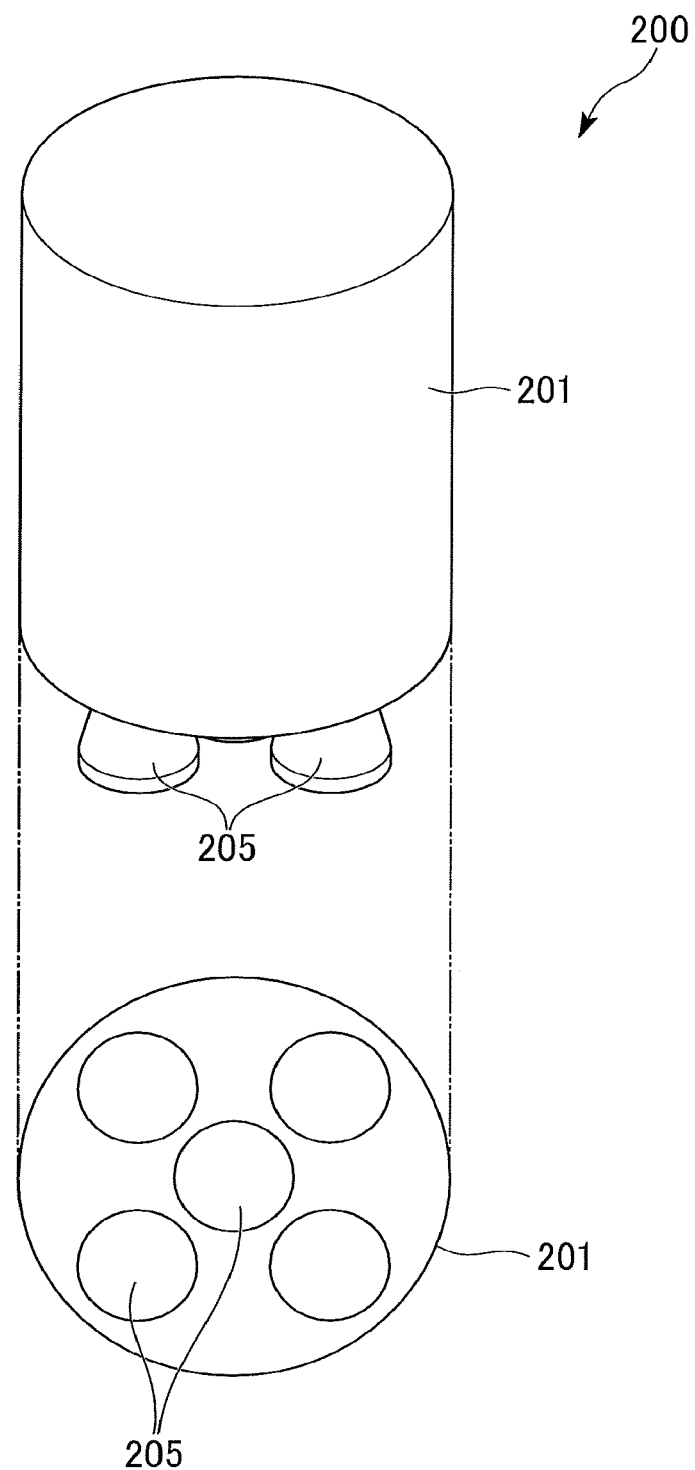
FIG. 21 is a view showing a holder according to a fourth modification example of the first embodiment.
Figure 22:
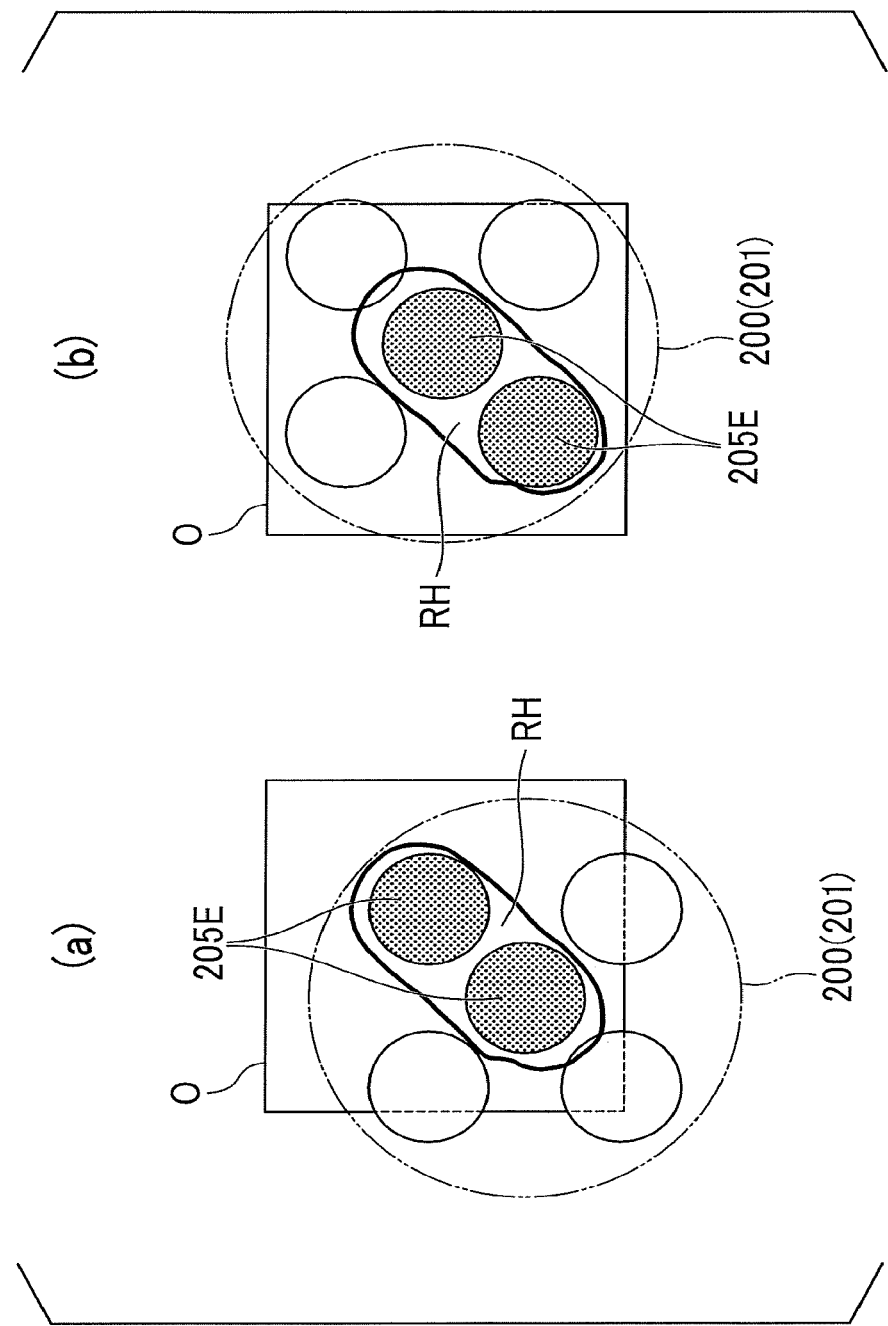
FIG. 22 is a diagram showing the amount of protrusion according to the fourth modification example of the first embodiment.

A fourth modification example relates to the holder 200 having a cross section other than a rectangle. FIG. 21 is a diagram showing the holder 200 in this modification example. As shown in FIG. 21, the holder 200 includes, for example, a columnar outer shape. FIG. 22 is a diagram showing the amount of protrusion of the modification example. For example, (a) in FIG. 22 shows a holding posture in which the holder 200 protrudes from two sides of the outer shape of the object O. On the other hand, (b) in FIG. 22 shows a holding posture in which the holder 200 protrudes from four sides of the outer shape of the object O. With such a configuration, it is possible to evaluate the amount of protrusion from the outer shape of the object O, as in the first embodiment.

Fifth Modification Example

Figure 23:
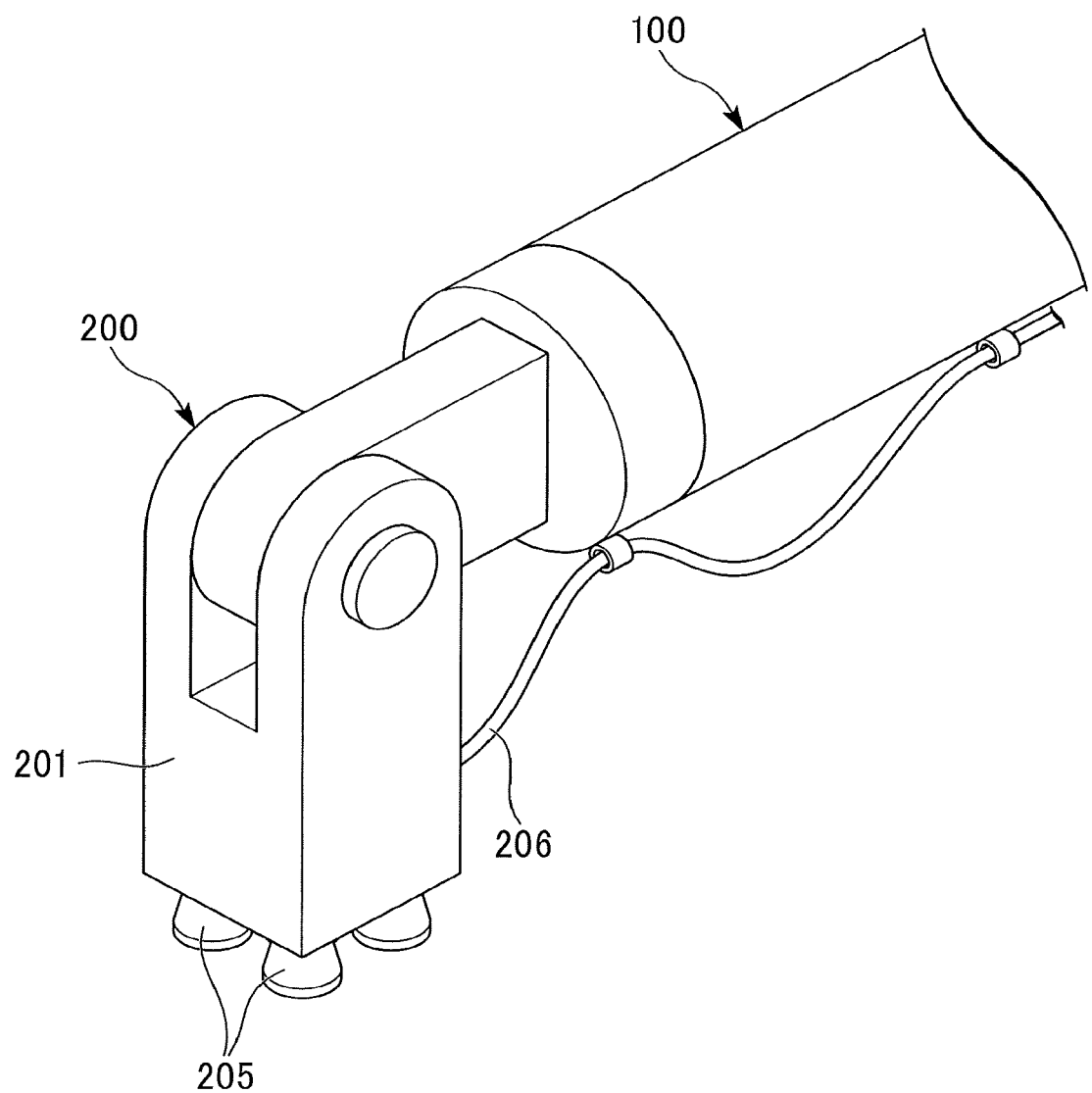
FIG. 23 is a perspective view showing a holder according to a fifth modification example of the first embodiment.

A fifth modification example relates to a case in which the outer shape of the holder 200 is set in consideration of an accessory component 206 such as a cable. FIG. 23 is a perspective view showing the holder 200. Here, even in a case where the shape of the holder 200 is designed to be as slim as possible, it is necessary for the accessory component 206 exposed to the outside to be provided in the holder 200 since various sensors or the like are required to be attached.

Figure 24:
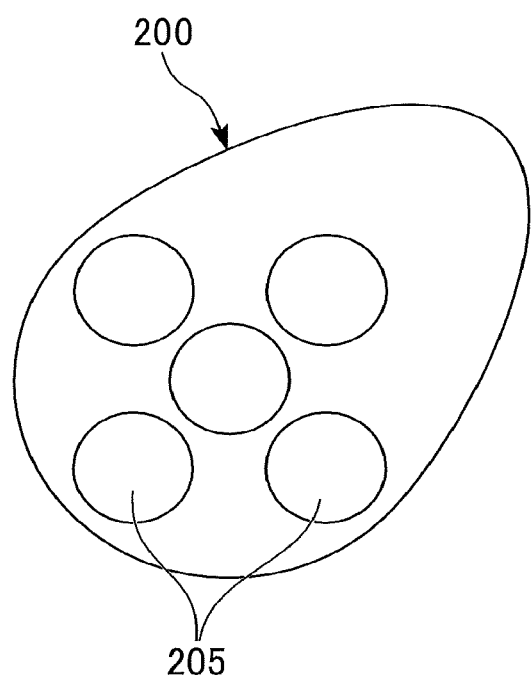
FIG. 24 is a bottom view showing an example of an outer shape of the holder in consideration of an accessory component according to the fifth modification example of the first embodiment.

Therefore, in this modification example, the accessory component 206 (for example, a cable) exposed to the outside of the holder 200 is regarded as a part of the outer shape of the holder 200 in addition to the outer shape of the base 201, and information indicating the outer shape of the holder 200 ("holder outer shape information" described above) is set. FIG. 24 is a bottom view showing an example of the outer shape of the holder 200 set in consideration of the accessory component 206. The outer shape of the holder 200 includes a bulge corresponding to a region in which there is the accessory component 206.

Figure 25:
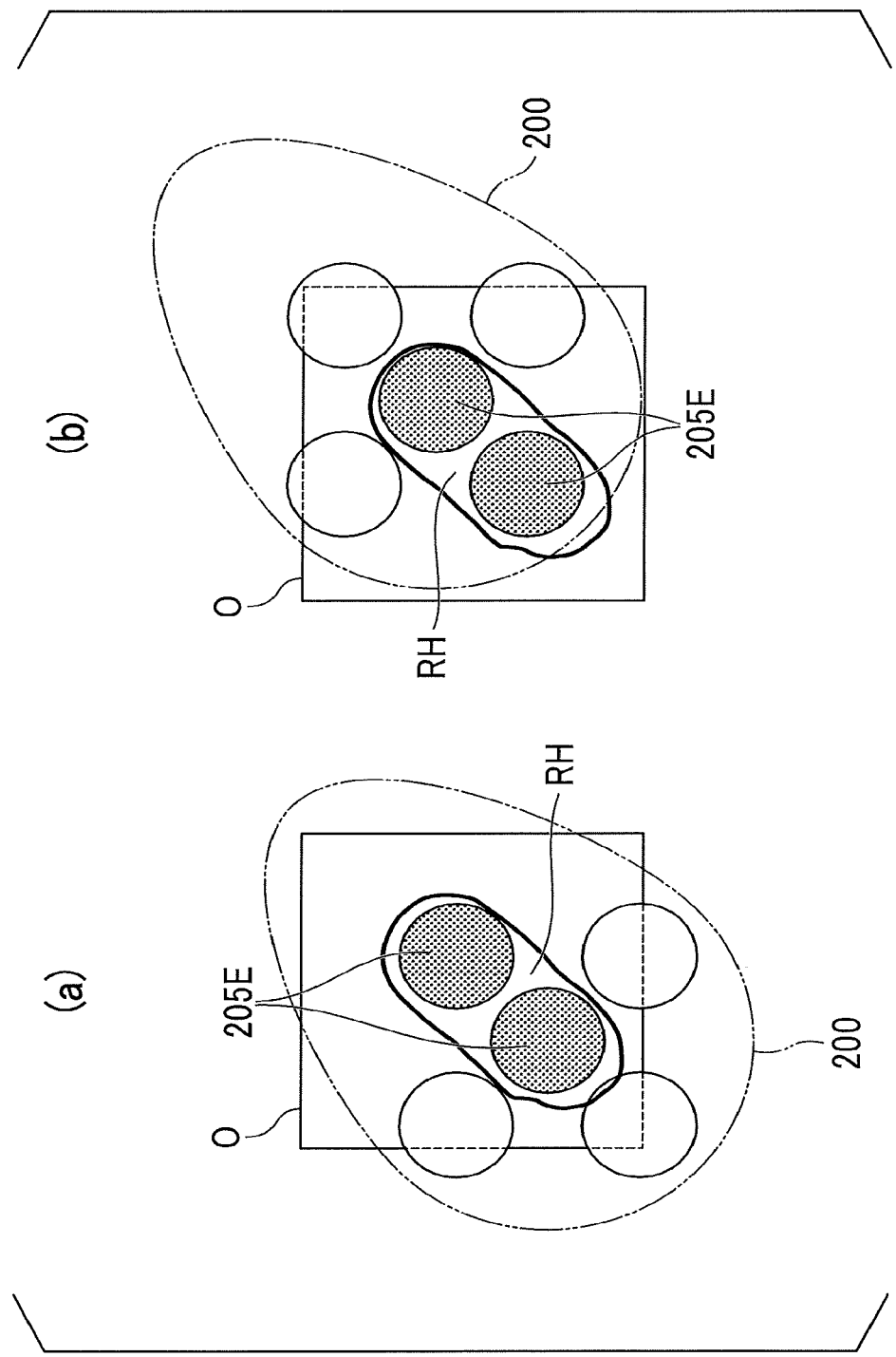
FIG. 25 is a diagram showing the amount of protrusion according to the fifth modification example of the first embodiment.

The evaluator 332 evaluates the amount of protrusion of the holder 200 from the object O based on the information indicating the outer shape of the holder 200 including the accessory component 206. FIG. 25 is a diagram showing the amount of protrusion of the modification example. For example, (a) in FIG. 25 shows a holding posture in which the holder 200 protrudes from four sides of the outer shape of the object O. On the other hand, (b) in FIG. 25 shows a holding posture in which the holder 200 protrudes from two sides of the outer shape of the object O. According to such a configuration, it is possible to evaluate the amount of protrusion from the outer shape of the object O further in consideration of the accessory component 206.

Second Embodiment

Next, a second embodiment will be described. This embodiment is different from the first embodiment in that protrusion of the object O from the outer shape of the holder 200 is evaluated in place of the protrusion of the holder 200 from the outer shape of the object O. It should be noted that configurations other than those described below are the same as those in the first embodiment.

(Process of Evaluator)

Figure 26:
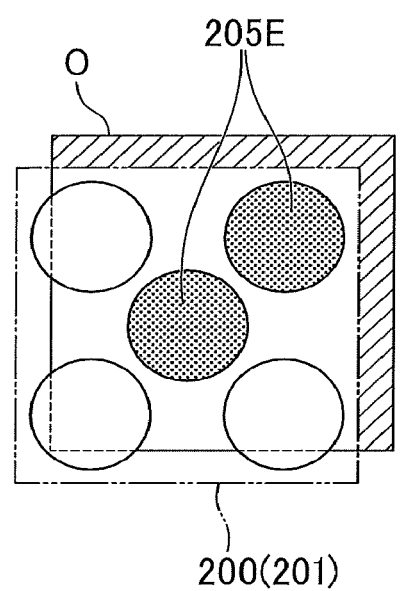
FIG. 26 is a diagram showing the amount of protrusion evaluated according to a second embodiment.

FIG. 26 is a diagram showing an amount of protrusion that is evaluated in the second embodiment. In the second embodiment, the evaluator 332 evaluates protrusion of the object O from the outer shape of the holder 200 for each of a plurality of holdable postures determined by the first determiner 331 based on information indicating an outer shape of the object O (the "object outer shape information" described above) and information indicating an outer shape of the holder 200 (the "holder outer shape information" described above). Further, in the second embodiment, the evaluator 332 evaluates the protrusion of the object O from the outer shape of the holder 200 at each of the plurality of holdable positions, for each of the plurality of holdable postures. In FIG. 26, a portion of the object O protruding from the outer shape of the holder 200 is hatched for convenience of description.

Specifically, in the second embodiment, the evaluator 332 evaluates the protrusion of the object O from the outer shape of the holder 200 based on the amount of protrusion of the object O from the outer shape of the holder 200. The "amount of protrusion" is the number of sides of the outer shape of the holder 200 from which the object O protrudes, for example, in a case where the outer shape of the holder 200 is regarded as a polygon (for example, the outer shape of the holder 200 is registered as a polygon or a shape approximating the polygon). Further, in another example, the amount of protrusion is an area of a portion of the object O protruding from the outer shape of the holder 200.

(Process of Second Determiner)

In the second embodiment, the second determiner 333 determines the holding posture and the holding position of the holder 200 from among the plurality of holdable postures and the plurality of holdable positions determined by the first determiner 331 based on an evaluation result of the evaluator 332. For example, the second determiner 333 determines the holding posture and the holdable position of the holder 200 from the plurality of holdable postures and the plurality of holdable positions so that the amount of protrusion satisfies a second condition.

"Satisfy the second condition" means, for example, that the amount of protrusion becomes equal to or larger than a predetermined amount or within the predetermined range among the plurality of holdable postures determined by the first determiner 331. The amount of protrusion is, for example, the number of sides of the outer shape of the holder 200 from which the object O protrudes in a case where the outer shape of the holder 200 is regarded as a polygon. Further, in another example, the amount of protrusion is also an area of a portion of the object O protruding from the outer shape of the holder 200.

In a case where the amount of protrusion is the number of sides of the outer shape of the holder 200 from which the object O protrudes, "satisfy a predetermined second condition" means that the number of sides of the outer shape of the holder 200 from which the object O protrudes is equal to or larger than a predetermined number (for example, equal to or larger than 2). However, "equal to or larger than predetermined number" is not limited to be "equal to or larger than 2" and may be set to be "equal to or larger than 1" or may be set to be "equal to or larger than 3" or equal to or larger than another number.

Here, in a case where the holder 200 protrudes from two sides of the outer shape of the object O, the second determiner 333 may determine the holdable posture in which the two sides are continuous with each other to be a holding posture of the holder 200 in preference to the holdable posture in which the two sides are not continuous with each other.

On the other hand, in a case where the amount of protrusion is the area of the portion of the object O protruding from the outer shape of the holder 200, "satisfy the predetermined second condition" means, for example, that the area of the portion of the object O protruding from the outer shape of the holder 200 is within a predetermined range.

It should be noted that the amount of protrusion may be calculated based on both "the number of sides of the outer shape of the holder 200 from which the object O protrudes" and "the area of the portion of the object O protruding from the outer shape of the holder 200".

Further, the evaluator 332 may specify at least one of a direction in which the object O should protrude from the outer shape of the holder 200 and a side of the holder 200 from which the object O should protrude, based on the information on the movement destination S2 of the object O (for example, the "movement destination shape information" and the "movement destination loading information" described above), and increases a weight for the amount of protrusion of the object O relating to at least one of the specified direction and the specified side of the holder 200. "Increase a weight" described herein means making it easy to be adopted as the holding posture of the holder 200. Thus, it is easy for the holding posture in which the object O protrudes in the specified direction or from the specified side of the holder 200 to be selected.

According to such a configuration, the object O protrudes from the outer shape of the holder 200 in a state in which the object O is held by the holder 200. Therefore, it is easy for the object O that is a transport target to be packed densely with respect to an inner wall surface of the movement destination container S2 or the previously placed object O, as in the first embodiment. It should be noted that the second embodiment may be implemented in combination with concepts described in the first to fifth modification examples of the first embodiment.

Although some embodiments and modification examples have been described above, the embodiments are not limited to the above examples. For example, the holding posture and the holding position may be determined based on both the protrusion of the holder 200 from the outer shape of the object O and the protrusion of the object O from the outer shape of the holder 200. Further, the outer shape of the object O and the outer shape of the holder 200 are not limited to the rectangle and may be a triangle or may be a polygon including a pentagon or more.

In addition, some functional units of the controller 300 may be provided in the management device 13 instead of the holding device 10. For example, the information acquirer 310, the information analyzer 320, the planner 330, and the storage 350 may be provided in the management device 13. The planner 330 is an example of the "information processor".

According to at least one embodiment described above, the transport device includes the controller that determines a holding posture and a holding position of the holder with respect to the object so that at least one of protrusion of the holder from an outer shape of the object and protrusion of the object from an outer shape of the holder satisfies a predetermined condition. According to such a configuration, it may be easy for objects to be packed densely.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A holding device comprising:
a holder configured to hold an object; and
a controller configured to determine a holding posture and a holding position of the holder with respect to the object so that at least one of protrusion of the holder from an outer shape of the object and protrusion of the object from an outer shape of the holder satisfies a predetermined condition when viewed in a direction in which the object and the holder overlap each other, based on information indicating the outer shape of the object,
wherein the predetermined condition is satisfied when the controller determines that a number of sides from which the holder protrudes among sides of the outer shape of the object is minimum or equal to or smaller than a predetermined number, or when the controller determines that a number of sides from which the object protrudes among sides of the outer shape of the holder is equal to or larger than a predetermined number, and
wherein the controller comprises:
a first determiner configured to determine a plurality of holdable postures of the holder with respect to the object based on information indicating a holdable region that can be held by the holder in a surface of the object;
an evaluator configured to evaluate at least one of the protrusion of the holder from the outer shape of the object and the protrusion of the object from the outer shape of the holder for each of the plurality of holdable postures determined by the first determiner based on information indicating the outer shape of the object; and
a second determiner configured to determine the holding posture of the holder from among the plurality of holdable postures based on the evaluation by the evaluator.

2. The holding device according to claim 1, wherein
the first determiner determines a plurality of holdable positions of the holder for each of the plurality of holdable postures,
the evaluator evaluates at least one of the protrusion of the holder from the outer shape of the object and the protrusion of the object from the outer shape of the holder at each of the plurality of holdable positions, for each of the plurality of holdable postures, and
the second determiner determines the holding posture and the holding position of the holder based on the evaluation by the evaluator.

3. The holding device according to claim 1, wherein
the evaluator evaluates the protrusion of the holder from the outer shape of the object based on an amount of the protrusion of the holder from the outer shape of the object, and
the second determiner determines the holding posture and the holding position of the holder so that the amount of protrusion of the holder from the outer shape of the object satisfies a first condition.

4. The holding device according to claim 3, wherein
the amount of protrusion is the number of sides from which the holder protrudes among the sides of the outer shape of the object in a case where the outer shape of the object is regarded as a polygon.

5. The holding device according to claim 4, wherein
the second determiner determines the holding posture and the holding position of the holder so that the number of sides from which the holder protrudes among the sides of the outer shape of the object is minimum or equal to or smaller than a predetermined number.

6. The holding device according to claim 4, wherein
in a case where the holder protrudes from two sides among the sides of the outer shape of the object, the second determiner determines a holdable posture in which the two sides are continuous with each other as the holding posture in preference to a holdable posture in which the two sides are not continuous with each other.

7. The holding device according to claim 3, wherein
the amount of protrusion is an area of a portion of the holder protruding from the outer shape of the object.

8. The holding device according to claim 7, wherein
the second determiner determines the holding posture and the holding position of the holder so that the area of the portion of the holder protruding from the outer shape of the object is a minimum value or is equal to or smaller than the predetermined value.

9. The holding device according to claim 3, wherein
the evaluator specifies at least one of a direction in which the holder should not protrude from the outer shape of the object and a side of the object from which the holder should not protrude, based on information on a movement destination of the object, and the evaluator increase a weight for the amount of protrusion of the holder relating to at least one of the specified direction and the specified side of the object.

10. The holding device according to claim 1, wherein
the evaluator evaluates the protrusion of the object from the outer shape of the holder based on an amount of the protrusion of the object from the outer shape of the holder, and
the second determiner determines the holding posture and the holding position of the holder so that the amount of protrusion of the object from the outer shape of the holder satisfies a second condition.

11. The holding device according to claim 10, wherein
the amount of protrusion is the number of sides of the holder from which the object protrudes among the sides of the outer shape of the holder in a case where the outer shape of the holder is regarded as a polygon.

12. The holding device according to claim 10, wherein
the evaluator specifies at least one of a direction in which the object should protrude from the outer shape of the holder and a side of the holder from which the object should protrude, based on information on a movement destination of the object, and the evaluator increase a weight for the amount of protrusion of the object relating to at least one of the specified direction and the specified side of the holder.

13. The holding device according to claim 1, wherein
the holder comprises a plurality of suckers, and
the first determiner determines a plurality of holding postures in each of which at least one sucker included in the plurality of suckers is disposed within the holdable region, as the plurality of holdable postures.

14. The holding device according to claim 13, wherein the first determiner determines the plurality of holding postures using at least one model pattern obtained by limiting arrangement patterns of the plurality of suckers based on symmetry of arrangement positions of the plurality of suckers.

15. A transportation system comprising:
an information acquirer configured to acquire information indicating an outer shape of an object; and
an information processor configured to determine a holding posture and a holding position of a holder with respect to the object so that at least one of protrusion of the holder from the outer shape of the object and protrusion of the object from an outer shape of the holder satisfies a predetermined condition when viewed in a direction in which the object and the holder overlap, based on information obtained from the information acquirer,
wherein the predetermined condition is satisfied when the information processor determines that a number of sides from which the holder protrudes among sides of the outer shape of the object is minimum or equal to or smaller than a predetermined number, or when the information processor determines that a number of sides from which the object protrudes among sides of the outer shape of the holder is equal to or larger than a predetermined number, and
wherein the information processor comprises:
a first determiner configured to determine a plurality of holdable postures of the holder with respect to the object based on information indicating a holdable re ion that can be held by the holder in a surface of the object;
an evaluator configured to evaluate at least one of the protrusion of the holder from the outer shape of the object and the protrusion of the object from the outer shape of the holder for each of the plurality of holdable postures determined by the first determiner based on information indicating the outer shape of the object; and
a second determiner configured to determine the holding posture of the holder from among the plurality of holdable postures based on the evaluation by the evaluator.

16. A controller comprising:
an information acquirer configured to acquire information indicating an outer shape of an object; and
an information processor configured to determine a holding posture and a holding position of a holder with respect to the object so that at least one of protrusion of the holder from the outer shape of the object and protrusion of the object from an outer shape of the holder satisfies a predetermined condition when viewed in a direction in which the object and the holder overlap each other, based on information obtained from the information acquirer,
wherein the predetermined condition is satisfied when the information processor determines that a number of sides from which the holder protrudes among sides of the outer shape of the object is minimum or equal to or smaller than a predetermined number, or when the information processor determines that a number of sides from which the object protrudes among sides of the outer shape of the holder is equal to or larger than a predetermined number, and
wherein the information processor comprises:
a first determiner configured to determine a plurality of holdable postures of the holder with respect to the object based on information indicating a holdable re ion that can be held by the holder in a surface of the object;
an evaluator configured to evaluate at least one of the protrusion of the holder from the outer shape of the object and the protrusion of the object from the outer shape of the holder for each of the plurality of holdable postures determined by the first determiner based on information indicating the outer shape of the object; and
a second determiner configured to determine the holding posture of the holder from among the plurality of holdable postures based on the evaluation by the evaluator.

17. The holding device according to claim 1, wherein the predetermined condition is satisfied when the controller determines that the number of sides from which the holder protrudes among the sides of the outer shape of the object is minimum or equal to or smaller than the predetermined number.

18. The holding device according to claim 1, wherein the predetermined condition is satisfied when the controller determines that the number of sides from which the object protrudes among the sides of the outer shape of the holder is equal to or larger than the predetermined number.

* * * * *